United States Patent
Tajima et al.

(10) Patent No.: US 9,467,904 B2
(45) Date of Patent: Oct. 11, 2016

(54) MOBILE STATION, BASE STATION, AND COMMUNICATION METHOD

(71) Applicants: FUJITSU LIMITED, Kawasaki-shi, Kanagawa (JP); Mihoko Sugiyama

(72) Inventors: Yoshiharu Tajima, Yokohama (JP); Yoshinori Tanaka, Yokohama (JP); Yoshiaki Ohta, Yokohama (JP); Katsumasa Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/513,527

(22) Filed: Oct. 14, 2014

(65) Prior Publication Data

US 2015/0031365 A1    Jan. 29, 2015

Related U.S. Application Data

(63) Continuation of application No. PCT/JP2012/061440, filed on Apr. 27, 2012.

(51) Int. Cl.
*H04W 36/36* (2009.01)
*H04W 36/00* (2009.01)
*H04W 36/24* (2009.01)

(52) U.S. Cl.
CPC ......... *H04W 36/0005* (2013.01); *H04W 36/24* (2013.01); *H04W 36/0055* (2013.01)

(58) Field of Classification Search
CPC ........... H04W 36/00; H04W 36/0005; H04W 36/0016; H04W 36/0022; H04W 36/0033; H04W 36/0083; H04W 36/16; H04W 36/20; H04W 36/24; H04W 36/30; H04W 36/34; H04W 36/36

USPC ........................................ 455/436, 437, 440
See application file for complete search history.

(56) References Cited

U.S. PATENT DOCUMENTS

| | | | |
|---|---|---|---|
| 9,026,671 B2 * | 5/2015 | Gillies | H04L 12/1881 370/230 |
| 2009/0279507 A1 | 11/2009 | Kanazawa et al. | |
| 2010/0210271 A1 * | 8/2010 | Neubacher | H04W 36/245 455/438 |
| 2011/0317578 A1 | 12/2011 | Tomita et al. | |

(Continued)

FOREIGN PATENT DOCUMENTS

| JP | 1999-313358 | 11/1999 |
|---|---|---|
| JP | 2000-013840 | 1/2000 |

(Continued)

OTHER PUBLICATIONS

International Search Report with observation issued for corresponding International Patent Application No. PCT/JP2012/061440 mailed Jul. 24, 2012. English translation attached.

(Continued)

*Primary Examiner* — Siu Lee
(74) *Attorney, Agent, or Firm* — Myers Wolin, LLC

(57) ABSTRACT

A mobile station includes a notifying unit configured to transmit a notification signal to a base station forming a serving cell, when a certain condition used to determine whether or not to perform a handover is satisfied, and a handover processing unit configured to start a handover process according to presence or absence of first communication data after transmission of the notification signal.

7 Claims, 19 Drawing Sheets

(56) References Cited

U.S. PATENT DOCUMENTS

| | | | |
|---|---|---|---|
| 2012/0320814 A1* | 12/2012 | Chen | H04W 36/023 370/312 |
| 2013/0109388 A1* | 5/2013 | Jung | H04W 36/0005 455/436 |

FOREIGN PATENT DOCUMENTS

| | | |
|---|---|---|
| JP | 2008-187688 | 8/2008 |
| JP | 2008-306453 | 12/2008 |
| JP | 2009-206860 | 9/2009 |
| JP | 2012-15600 | 1/2012 |
| WO | 2007/069319 A1 | 6/2007 |
| WO | 2008/054775 A2 | 5/2008 |
| WO | 2011/079478 A1 | 7/2011 |

OTHER PUBLICATIONS

Partial supplementary European search report issued for corresponding European Patent Application No. 12875179.9 dated May 5, 2015.

* cited by examiner

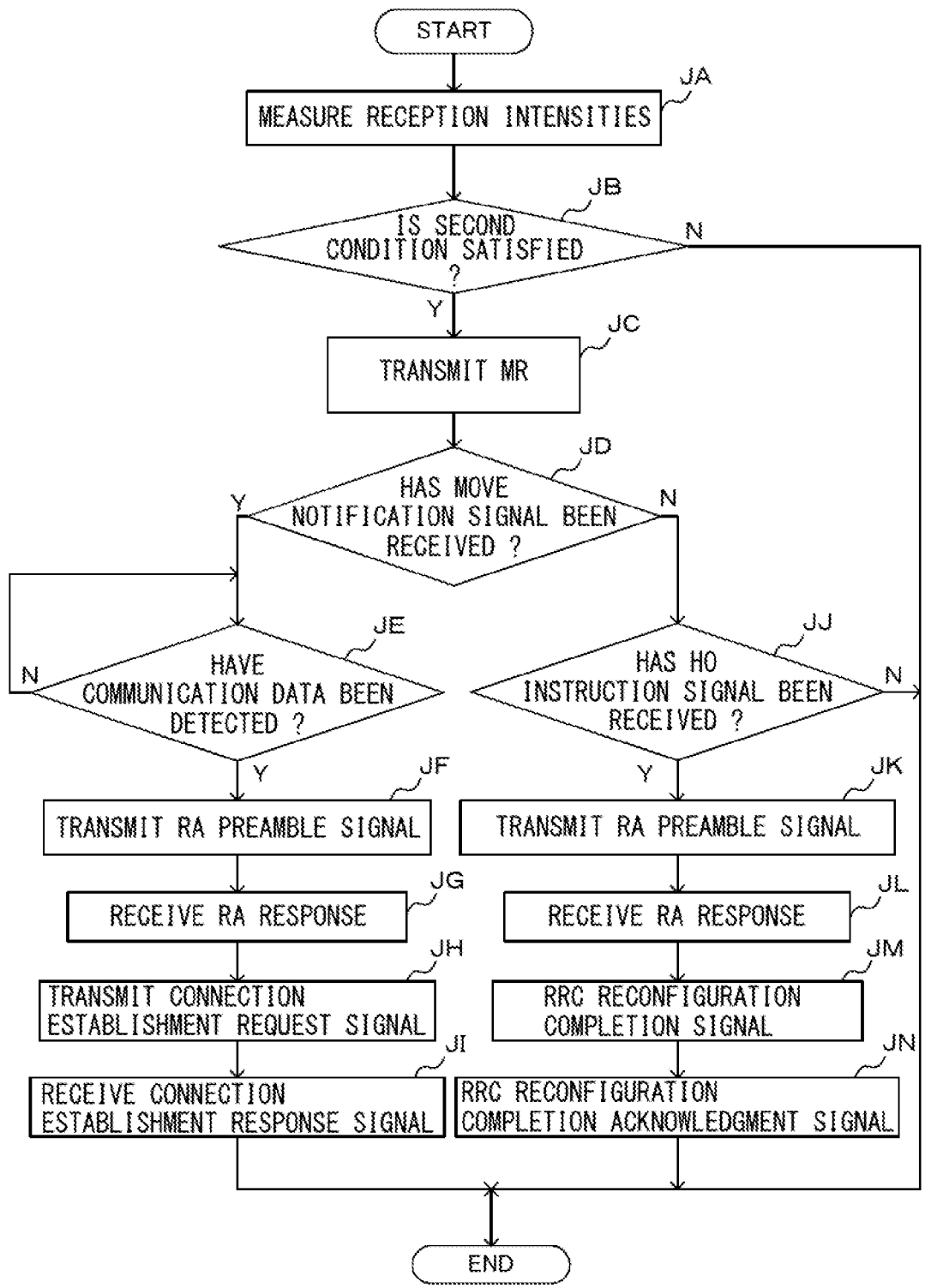

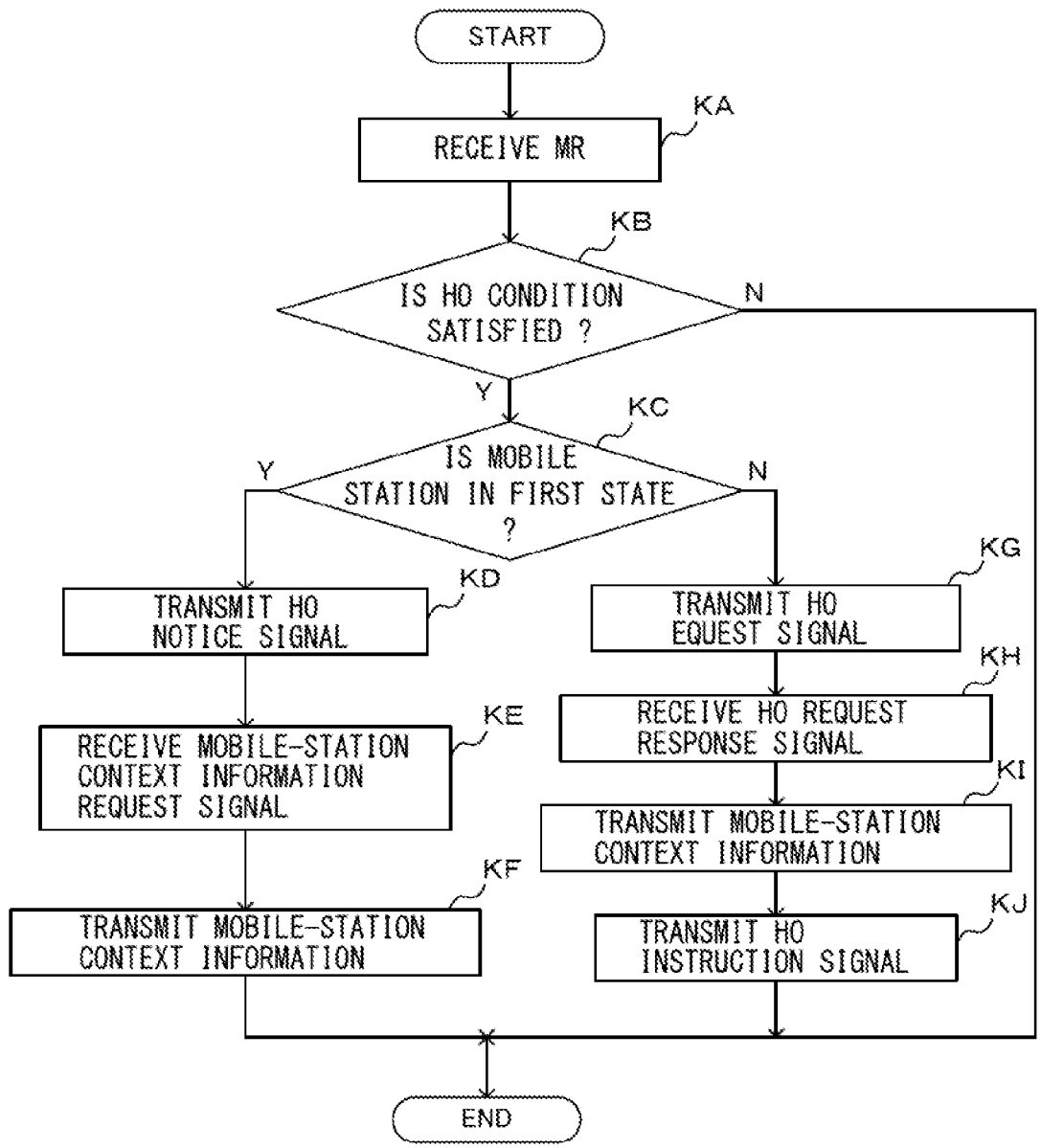

MOBILE STATION, BASE STATION, AND COMMUNICATION METHOD

CROSS-REFERENCE TO RELATED APPLICATION

This application is a continuation application of International Application PCT/JP2012/061440 filed on Apr. 27, 2012 and designated the U.S., the entire contents of which are incorporated herein by reference.

FIELD

Embodiments described herein relate to handover technology in a mobile communication system.

BACKGROUND

As technology related to handover in a mobile communication system, a communication control device is known. The control communication device controls communications between mobile devices and base stations which communication areas overlap with adjacent base stations. Such a communication control device includes a resource managing unit, a mobile-device managing unit, and a resource adjusting unit. The resource managing unit obtains, from each of the base stations, resource information indicating the operation state of each of the base stations, and manages the obtained resource information. The mobile-device managing unit obtains, from each of the mobile devices, device information indicating the operation state of each of the mobile devices, and manages the obtained device information. The resource adjusting unit specifies a mobile device and base stations to be involved in a handover, from among the portable devices and the base stations, on the basis of the device information and the resource information.

Related art is disclosed in Japanese Laid-open Patent Publication No. 2008-187688.

SUMMARY

According to an aspect of the embodiments, a mobile station is provided. The mobile station includes a notifying unit configured to transmit a notification signal to a base station forming a serving cell, when a certain condition used to determine whether or not to perform a handover is satisfied, and a handover processing unit configured to start a handover process according to presence or absence of first communication data after transmission of the notification signal.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 18 is an explanatory diagram illustrating a third example of the operation of the mobile station.

FIG. 19 is an explanatory diagram illustrating a third example of the operation of the serving base station.

DESCRIPTION OF EMBODIMENTS

<1. Hardware Configuration>

Figure 1:
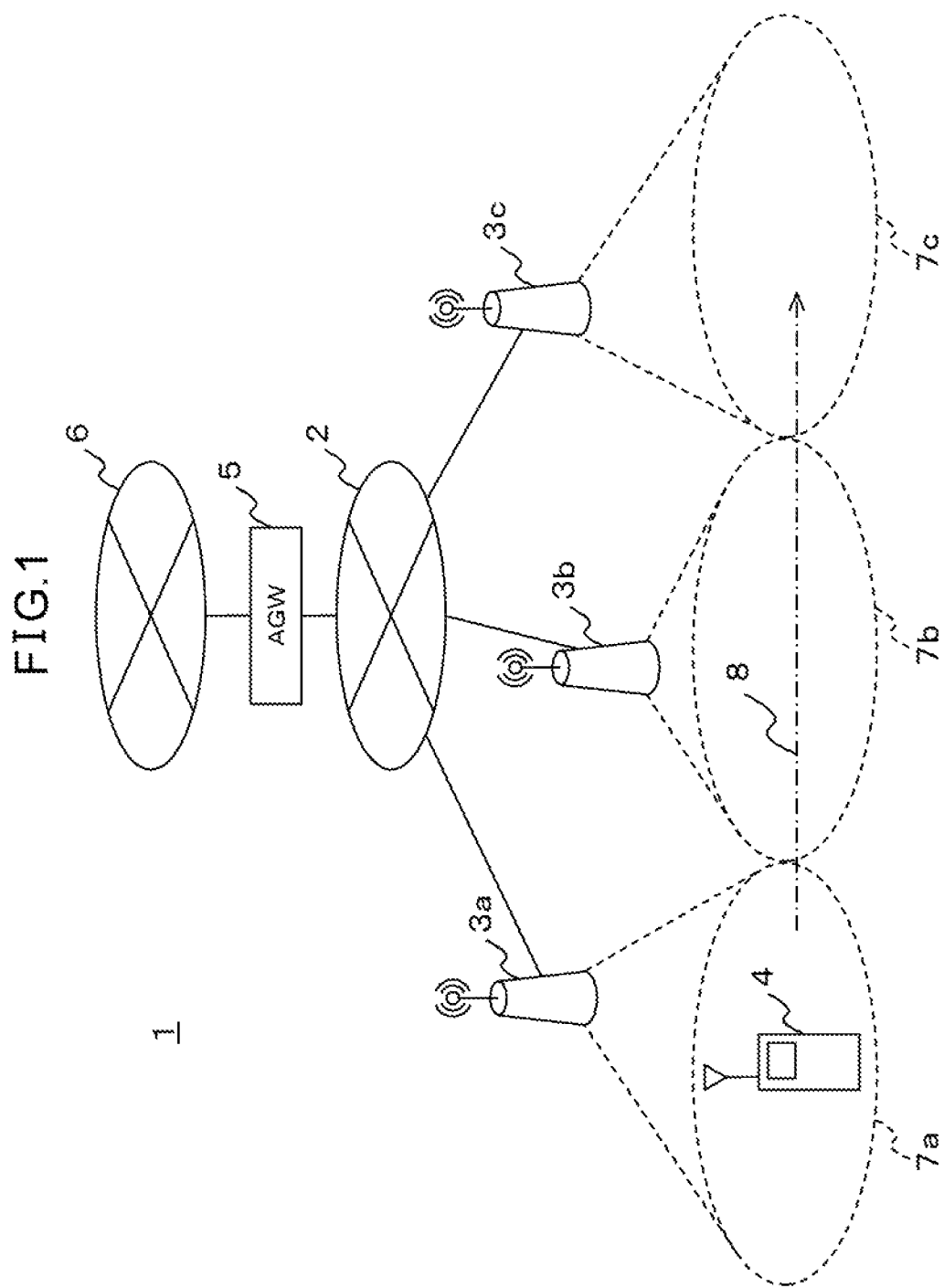
FIG. 1 is a diagram illustrating an example of the entire configuration of a communication system.

In the following, preferred embodiments will be described with reference to the accompanying drawings. FIG. 1 is a diagram illustrating an example of the entire configuration of a communication system. A communication system 1 includes an access network 2, base stations 3a to 3c, a mobile station 4, an access gateway device 5, and a core network 6. The communication system 1 may be an LTE (Long Term Evolution)-based mobile communication system developed by the 3GPP (Third Generation Partnership Project), for example. The mobile station, base station and method disclosed herein are also applicable to any other cellular-based mobile communication systems. In the accompanying drawings and the following description, an access gateway device is sometimes referred to as an "AGW". Furthermore, the base stations 3a to 3c are sometimes referred to as "base stations 3", collectively.

The base stations 3, which form the access network 2, relay communications between the mobile station 4 of a user receiving mobile communication service and a wired communication network on the ground, according to a predetermined radio communication standard. The core network 6 is connected to a public network such as a telephone network or the Internet. In the core network 6, a connecting process and data transfer between the mobile station 4 and the public network are performed. The base stations 3 and the access network 2 are connected to the core network 6 via the AGW 5.

Reference signs 7a to 7c schematically denote cells which the base stations 3a to 3c cover, respectively. An arrow 8 schematically denotes a move of the mobile station 4 from the cell 7a to the cell 7c. In the following description, it is assumed that the mobile station 4 having radio resource control (RRC) connection established with the cell 7a moves from the cell 7*a* to the cell 7*b*, and then from the cell 7*b* to the cell 7*c*. In the accompanying drawings and the following description, radio resource control is sometimes referred to as "RRC".

When the mobile station 4 moves from one cell to another, a handover of the mobile station 4 is performed. In this description, the cell 7*a* in which the mobile station 4 has established RRC connection immediately before the handover is performed and the base station 3*a* covering the cell 7*a* are sometimes referred to as a "serving cell" and a "serving base station", respectively. Moreover, the cells 7*b* and 7*c* in which the mobile station 4 establishes RRC connection as a result of the handover are each sometimes referred to as a "target cell", and the base stations 3*b* and 3*c* having RRC connection with the mobile station 4 as a result of the handover are each sometimes referred to as a "target base station". Furthermore, the cells 7*a* to 7*c* are sometimes referred to as "cells 7", collectively. In the following description and the accompanying drawings, a handover is sometimes referred to as an "HO".

After having moved from the serving cell 7*a* to another cell, the mobile station 4 does not start an HO process with the target base station until communication data occur, but starts the HO process with the target base station after communication data occurs. This makes it possible to omit the HO process in a cell which the mobile station 4 passes before communication data occur, consequently reducing the number of times to perform the HO process.

For example, assume a case in which the mobile station 4 moves from the serving cell 7*a* to the cell 7*b* and then to the cell 7*c* in this order, and no communication data occur in the cell 7*b* while communication data occur for the first time when the mobile station 4 has reached the cell 7*c*. In this case, the mobile station 4 does not perform the HO process in the cell 7*b*, and the cell 7*c* is determined as a target cell.

<1.1. Hardware Configuration of Mobile Station>

Figure 2:
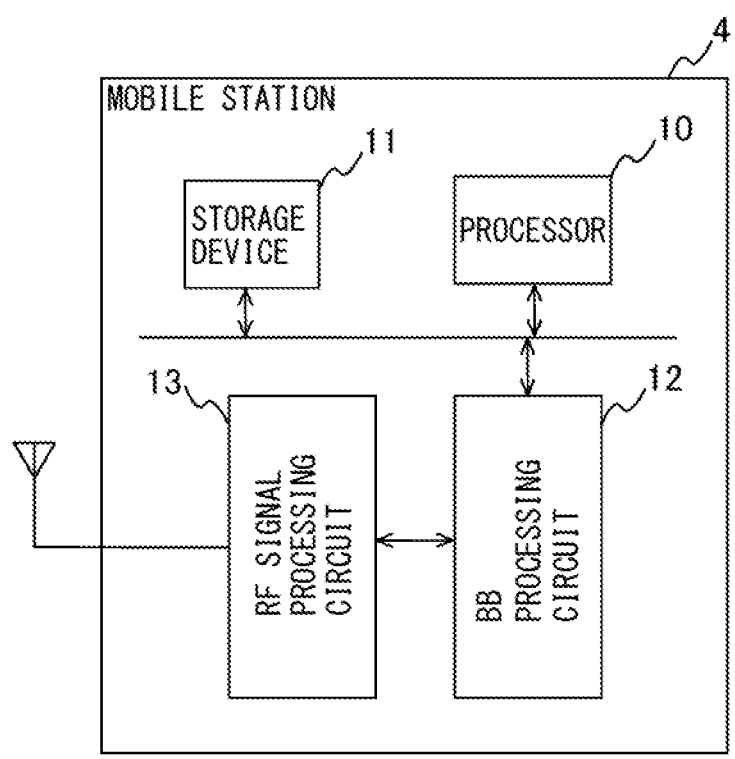
FIG. 2 is a diagram illustrating an example of the hardware configuration of a mobile station.

An example of the hardware configuration of the mobile station 4 will be described with reference to FIG. 2. FIG. 2 is a diagram illustrating an example of the hardware configuration of the mobile station 4. The mobile station 4 includes a processor 10, a storage device 11, a baseband processing circuit 12, and a radio frequency signal processing circuit 13. In the following description and the accompanying drawings, a baseband and a radio frequency are sometimes referred to as a "BB" and an "RF", respectively.

The processor 10 performs operation control of the mobile station 4 other than that performed by the BB processing circuit 12 to be described below, and executes application programs for user data processing. The storage device 11 stores application programs for information processing by the processor 10. In addition, each data and temporary data to be used during the execution of the programs are also stored in the storage device 11.

The BB processing circuit 12 performs encoding and modulation as well as demodulation and decoding of signals transmitted and received between the mobile station 4 and each of the base stations 3, communication protocol processing, and processing of BB signals related to scheduling. The BB processing circuit 12 may include a processor for signal processing and a memory for storing programs and data to be used in the operation of the processor. The processor may be a DSP (digital signal processor) or a CPU (Central Processing Unit), for example. In addition, the BB processing circuit 12 may include a logical circuit such as an LSI (large scale integration), an ASIC (application specific integrated circuit), or an FPGA (field-programming gate array).

The RF signal processing circuit 13 performs signal processing such as digital-to-analog conversion, analog-to-digital conversion, frequency conversion, signal amplification, and signal filtering, on radio signals transmitted and received between the mobile station 4 and each of the base stations 3.

<1.2. Hardware Configuration of Base Stations>

The hardware configuration of each of the base stations 3 will be described with reference to FIG. 3. Each of the base stations 3 includes a processor 20, a storage device 21, a BB processing circuit 22, an RF signal processing circuit 23, and a network interface circuit 24. In the following description and the accompanying drawings, a network interface is sometimes referred to as an "NIF".

The processor 20 performs a user management process and operation control of the base stations 3 other than that performed by the BB processing circuit 22 to be described below. The storage device 21 stores control programs for signal processing by the processor 20. In addition, data and temporary data to be used during the execution of the programs are also stored in the storage device 21.

The BB processing circuit 22 performs encoding and modulation as well as demodulation and decoding of signals transmitted and received between the mobile station 4 and each of the base stations 3, communication protocol processing, and processing of BB signals related to scheduling. The BB processing circuit 22 may include a processor for signal processing and a memory for storing programs and data to be used in the operation of the processor. In addition, the BB processing circuit 22 may include a logical circuit such as an LSI, an ASIC, or an FPGA.

The RF signal processing circuit 23 performs digital-to-analog conversion, analog-to-digital conversion, frequency conversion, signal amplification, and signal filtering, on radio signals transmitted and received between the mobile station 4 and each of the base stations 3. The NIF circuit 24 performs signal processing for transmitting and receiving signals with other base stations and the AGW 5 via the access network 2.

Figure 3:
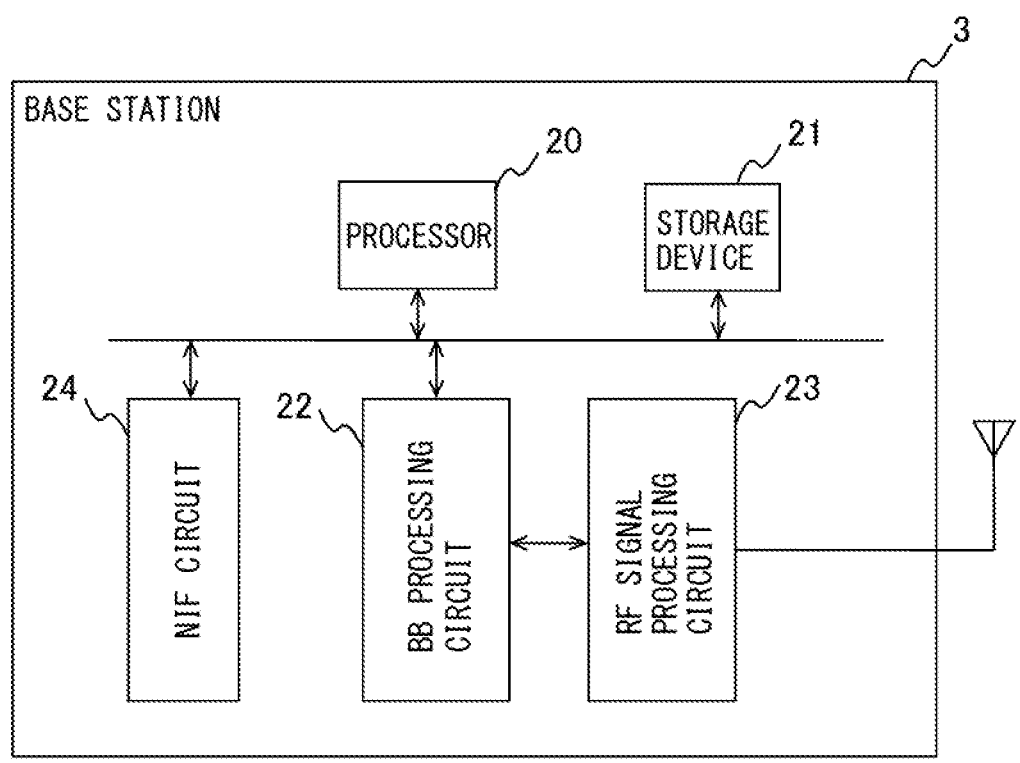
FIG. 3 is a diagram illustrating an example of the hardware configuration of a base station.

The hardware configurations illustrated in FIG. 2 and FIG. 3 are provided only as an example for illustrating this embodiment. The communication system described herein may employ any other hardware configurations as long as the configurations are capable of performing the operations to be described below.

<2. First Embodiment>
<2.1. Functional Configuration of Mobile Station>

Functions implemented by the above-described hardware configuration will be described. In the description of the first embodiment below, a case of performing an HO of the mobile station 4 from the serving cell 7*a* to the target cell 7*c* will be used as an example.

Figure 4:
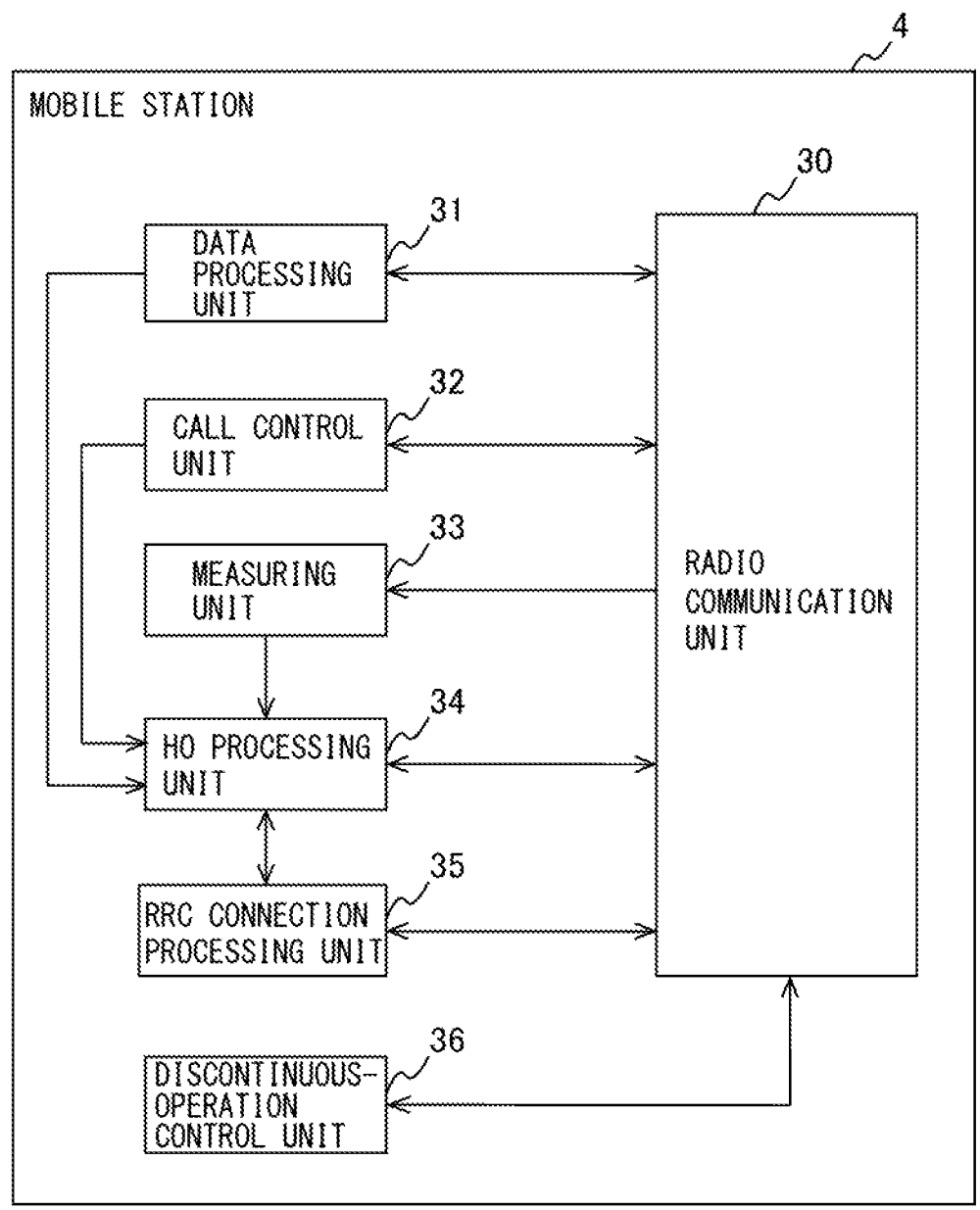
FIG. 4 is a diagram illustrating a first example of the functional configuration of the mobile station.

FIG. 4 is a diagram illustrating a first example of the functional configuration of the mobile station 4. The mobile station 4 includes a radio communication unit 30, a data processing unit 31, a call control unit 32, a measuring unit 33, an HO processing unit 34, an RRC connection processing unit 35, and a discontinuous-operation control unit 36.

The radio communication unit 30 performs a transmission/reception process, an encoding process, a decoding process, a modulation process, and a demodulation process on control signals and radio signals related to user traffic, the signals being transmitted and received between each of the base stations 3 and the mobile station 4. The data processing unit 31 processes communication data transmitted and received between each of the base stations 3 and the mobile station 4, i.e., user traffic. The call control unit 32 performs call control processes such as call initiation, call answering, and call clearing, between the mobile station 4 and each of the base stations 3.

The measuring unit 33 measures the reception intensity of a radio wave coming from each of the base stations 3. The HO processing unit 34 generates a measurement report (MR) including the reception intensity of the received radio wave measured by the measuring unit 33 and the identifier of the base station 3 which has transmitted the radio wave. In the accompanying drawings and the following description, a measurement report is sometimes referred to as an "MR".

The HO processing unit 34 performs the HO process for an HO between the serving base station 3a and the target base station 3c. When the reception intensities of radio waves coming from the respective base stations 3 satisfy a predetermined condition for determining whether or not to perform an HO, the HO processing unit 34 generates a move notification signal indicating that the mobile station 4 is to move from the serving cell 7a to a different cell.

In the following, the condition for determining whether or not to generate a move notification signal is sometimes referred to as a "first condition". The first condition may be a condition that the reception intensity of a radio wave from the serving base station 3a is smaller than that of a radio wave from a different cell by a threshold value Th1 or more, for example.

The HO processing unit 34 transmits a move notification signal to the serving base station 3a. The move notification signal may include an MR. The data processing unit 31 detects an occurrence of communication data in the uplink. Upon detection of the first occurrence of user traffic after transmission of the move notification signal, the HO processing unit 34 starts the HO process. The HO processing unit 34 causes the RRC connection processing unit 35 to start a process for establishing RRC connection with the target base station 3c, which covers the target cell 7c where the mobile station 4 is located when the HO processing unit 34 starts the HO process.

The RRC connection processing unit 35 establishes RRC connection by executing a random access procedure with the target base station 3c according to an instruction by the HO processing unit 34. In the accompanying drawings and the following description, random access is sometimes referred to as "RA".

The discontinuous-operation control unit 36 controls discontinuous operation of the mobile station 4 according to an instruction from each of the base stations 3. During the period in which the mobile station 4 performs discontinuous operation, the mobile station 4 performs DRX (Discontinuous Reception)/DTX (Discontinuous Transmission) for receiving signals from or transmitting signals to the base station 3 discontinuously.

The above-described operation of the radio communication unit 30 is carried out by the processor 10, the BB processing circuit 12, and the RF signal processing circuit 13 illustrated in FIG. 2, in cooperation with each other. The above-described operation of the measuring unit 33 is carried out by the BB processing circuit 12. The above-described operation of the data processing unit 31, the call control unit 32, the HO processing unit 34, the RRC connection processing unit 35, and the discontinuous-operation control unit 36 are carried out by the processor 10.

<2.2. Functional Configuration of Base Stations>

Figure 5:
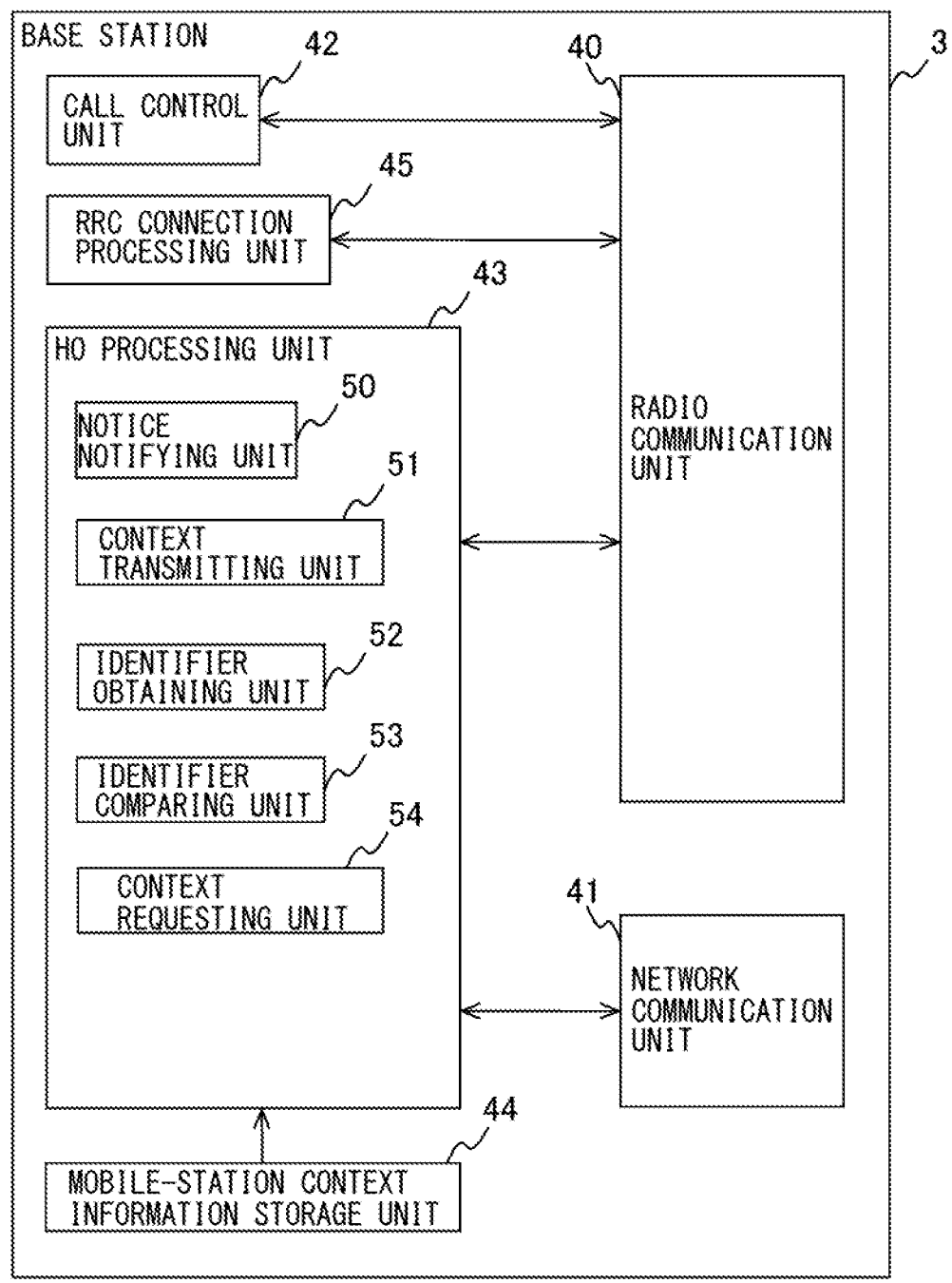
FIG. 5 is a diagram illustrating a first example of the functional configuration of the base station.

Functions of each of the base stations 3 will be described with reference to FIG. 5. FIG. 5 is a diagram illustrating a first example of the functional configuration of the base station 3. The base station 3 includes a radio communication unit 40, a network communication unit 41, a call control unit 42, an HO processing unit 43, a mobile-station context information storage unit 44, and an RRC connection processing unit 45.

The radio communication unit 40 performs a transmission/reception process, an encoding process, a decoding process, a modulation process, and a demodulation process on control signals and radio signals related to user traffic, the signals being transmitted and received between each of the base stations 3 and the mobile station 4. The network communication unit 41, which is an interface between the base station 3 and the access network 2, transmits packets to and receives packets from the access network 2. The call control unit 42 performs call control processes such as call initiation, call answering, and call clearing, between the mobile station 4 and each of the base stations 3.

The HO processing unit 43 performs the HO process for an HO of the mobile station 4 in the cell which the base station 3 covers. When the base station 3a receives a move notification signal from the mobile station 4 in the cell 7a, the HO processing unit 43 of the serving base station 3a transmits, to the other base stations 3 located nearby, an HO notice signal for notifying the other base stations 3 of an HO of the mobile station 4 in advance. The HO notice signal includes at least the identifier of the serving base station 3a and the identifier of the mobile station 4 included in corresponding mobile-station context information.

The mobile-station context information, which is held by one of the base stations 3 connected to the mobile station 4 by RRC connection, includes information to be used by the one of the base stations 3 in radio communication with the mobile station 4. The mobile-station context information may include, for example, the identifier of the base station 3, the identifier of the mobile station 4, a connection parameter, access-bearer setting information, RRC state information, and security content information to be used for security protection in access stratum. An example of mobile-station context information is "UE Context" used in LTE-based systems, for example.

When the mobile station 4 performs an RRC connection process with the target base station 3c, the target base station 3c requests the serving base station 3a to transmit the mobile-station context information on the mobile station 4. In response to the request for the mobile-station context information on the mobile station 4 by the target base station 3c, the HO processing unit 43 of the serving base station 3a transmits the mobile-station context information.

For this purpose, the HO processing unit 43 includes a notice notifying unit 50 and a context transmitting unit 51. Upon receipt of the move notification signal from the mobile station 4 in the cell 7a, the notice notifying unit 50 transmits, to the other base stations 3 located nearby, an HO notice signal for notifying of an HO of the mobile station 4 in advance. The notice notifying unit 50 may transmit an HO notice signal to the base station 3 specified in advance and located nearby geographically. Alternatively, when the move notification signal includes an MR, the notice notifying unit 50 may transmit an HO notice signal to the base station 3 whose identifier is included in the MR.

In response to the request of the mobile-station context information on the mobile station 4 from the target base station 3c, the context transmitting unit 51 transmits the mobile-station context information on the mobile station 4 stored in the mobile-station context information storage unit 44, to the target base station 3c.

Upon execution of the RA procedure with the mobile station 4, the HO processing unit 43 of the target base station 3c identifies the serving base station 3a of the mobile station 4, and requests the serving base station 3a to transmit the mobile-station context information on the mobile station 4. For this purpose, the HO processing unit 43 includes an identifier obtaining unit 52, an identifier comparing unit 53, and a context requesting unit 54.

The identifier obtaining unit 52 obtains the identifier of the base station 3a and the identifier of the mobile station 4 from the HO notice signal received from the serving base station 3a. The identifier comparing unit 53 compares the identifier of the mobile station 4 obtained in the RA procedure and the identifier of the mobile station 4 obtained from the HO notice signal, and thereby identifies the serving base station 3a which transmitted the HO notice signal related to the mobile station 4 carrying out the RA procedure.

The context requesting unit 54 requests the serving base station 3a to transmit the mobile-station context information on the mobile station 4. The context requesting unit 54 stores the received mobile-station context information in the mobile-station context information storage unit 44. The RRC connection processing unit 45 establishes RRC connection with the mobile station 4 by carrying out the RA procedure.

The above-described operation of the radio communication unit 40 is carried out by the processor 20, the BB processing circuit 22, and the RF signal processing circuit 23 illustrated in FIG. 3, in cooperation with each other. The above-described operation of the network communication unit 41 is carried out by the NIF circuit 24. The above-described operations of the call control unit 42, the HO processing unit 43, and the RRC connection processing unit 45 are carried out by the processor 20. The storage area of the mobile-station context information storage unit 44 is included in the storage device 21.

The functional configuration diagrams in FIG. 4 and FIG. 5 mainly illustrate configurations related to the functions of the mobile station 4 and the base stations 3 described herein. The mobile station 4 and the base stations 3 may include elements other than illustrated elements. This also applies to FIG. 10, FIG. 11, and FIG. 16.

<2.4. Signal Sequence>

Figure 6:
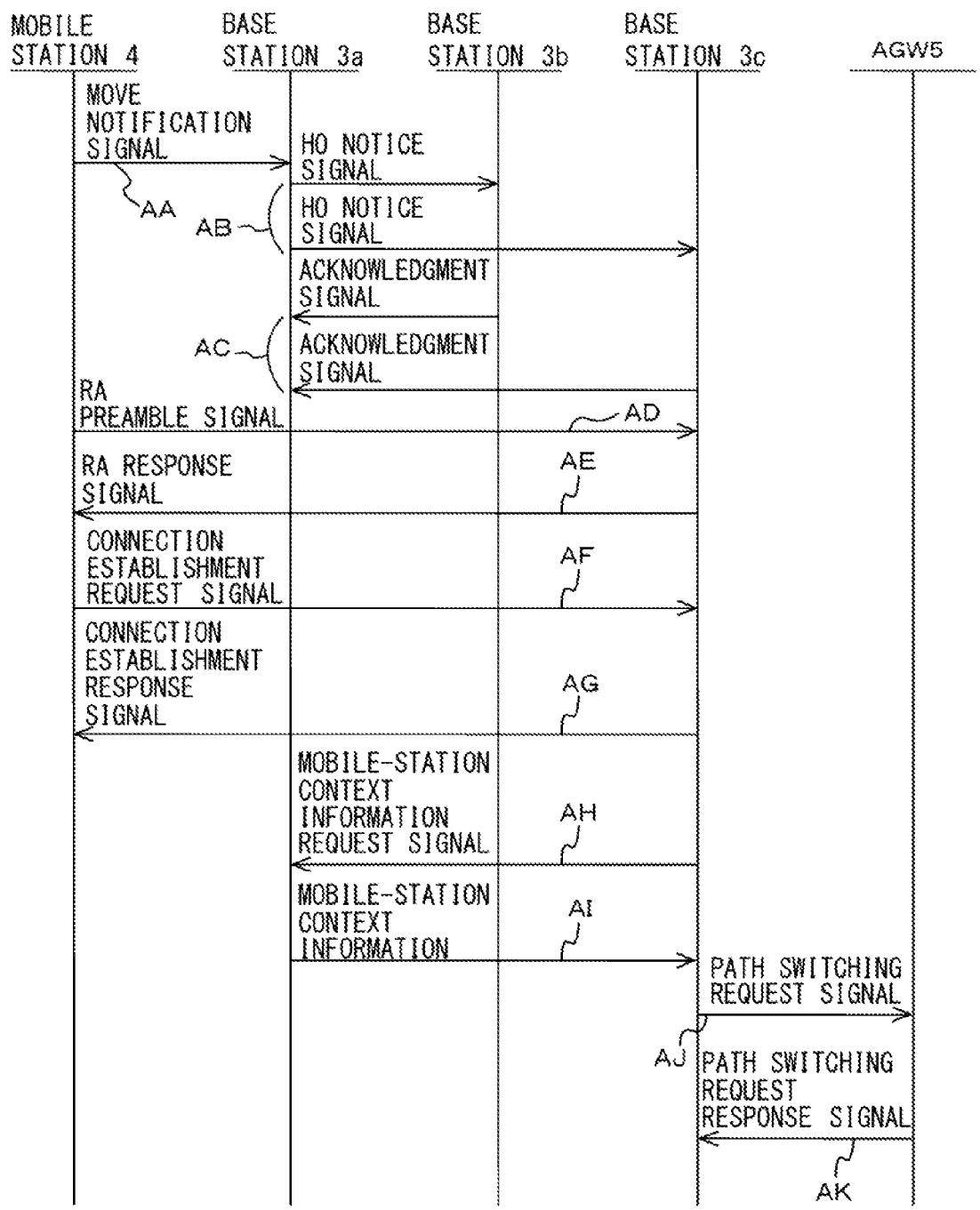
FIG. 6 is an explanatory diagram illustrating a first example of the signal sequence in a handover process.

An example of the signal sequence in the HO process in the first embodiment will be described with reference to FIG. 6. A series of operations to be described with reference to FIG. 6 may be understood as a method including multiple steps. In this case, "Operation" may be understood as "Step". This also applies to the operations illustrated in FIGS. 7 to 9, FIGS. 12 to 15, and FIGS. 17 to 19.

When the reception intensities of radio waves from the respective base stations 3 satisfy the first condition, the HO processing unit 34 of the mobile station 4 transmits a move notification signal to the serving base station 3a in Operation AA. In Operation AB, the HO processing unit 43 of the serving base station 3a transmits, to the other base stations 3b and 3c located nearby, an HO notice signal for notifying of an HO of the mobile station 4 in advance. The identifier obtaining unit 52 of each of the base stations 3b and 3c obtains the identifier of the serving base station 3a and the identifier of the mobile station 4 from the HO notice signal. In Operation AC, the HO processing unit 43 of each of the base stations 3b and 3c transmits, to the serving base station 3a, an acknowledgment signal for notifying that the HO notice signal has been received successfully.

Thereafter, when communication data occur in the uplink, the HO processing unit 34 of the mobile station 4 starts the HO process. It is assumed, at this stage, that the mobile station 4 is located in the cell 7c which the target base station 3c covers. In Operation AD, the RRC connection processing unit 35 of the mobile station 4 transmits an RA preamble to start an RA procedure with the target base station 3c. In Operation AE, the RRC connection processing unit 45 of the target base station 3c returns an RA response signal corresponding to the RA preamble, to the mobile station 4.

In Operation AF, the RRC connection processing unit 35 of the mobile station 4 transmits, to the target base station 3c, a connection establishment request signal for requesting RRC connection establishment with the target base station 3c. The connection establishment request signal includes the identifier of the mobile station 4. In Operation AG, the RRC connection processing unit 45 of the target base station 3c transmits, to the mobile station 4, a connection establishment response signal which is a response signal corresponding to the connection establishment request signal.

In Operation AH, the identifier comparing unit 53 of the target base station 3c compares the identifier of the mobile station 4 obtained from the connection establishment request signal and the identifier of the mobile station 4 obtained from the HO notice signal, and thereby identifies the serving base station 3a of the mobile station 4. The context requesting unit 54 requests the serving base station 3a to transmit the mobile-station context information on the mobile station 4. In Operation AI, the context transmitting unit 51 of the serving base station 3a transmits the mobile-station context information on the mobile station 4 to the target base station 3c. Through the above operations, RRC connection between the mobile station 4 and the target base station 3c is established.

In Operation AJ, the HO processing unit 43 of the target base station 3c transmits, to the AGW 5, a path switching request signal for switching the base station through which the transmission path of communication data to the mobile station 4 passes, to the target base station 3c. In Operation AK, the AGW 5 transmits a path switching request response signal to the target base station 3c.

<2.5. Operation of Mobile Station>

Figure 7:
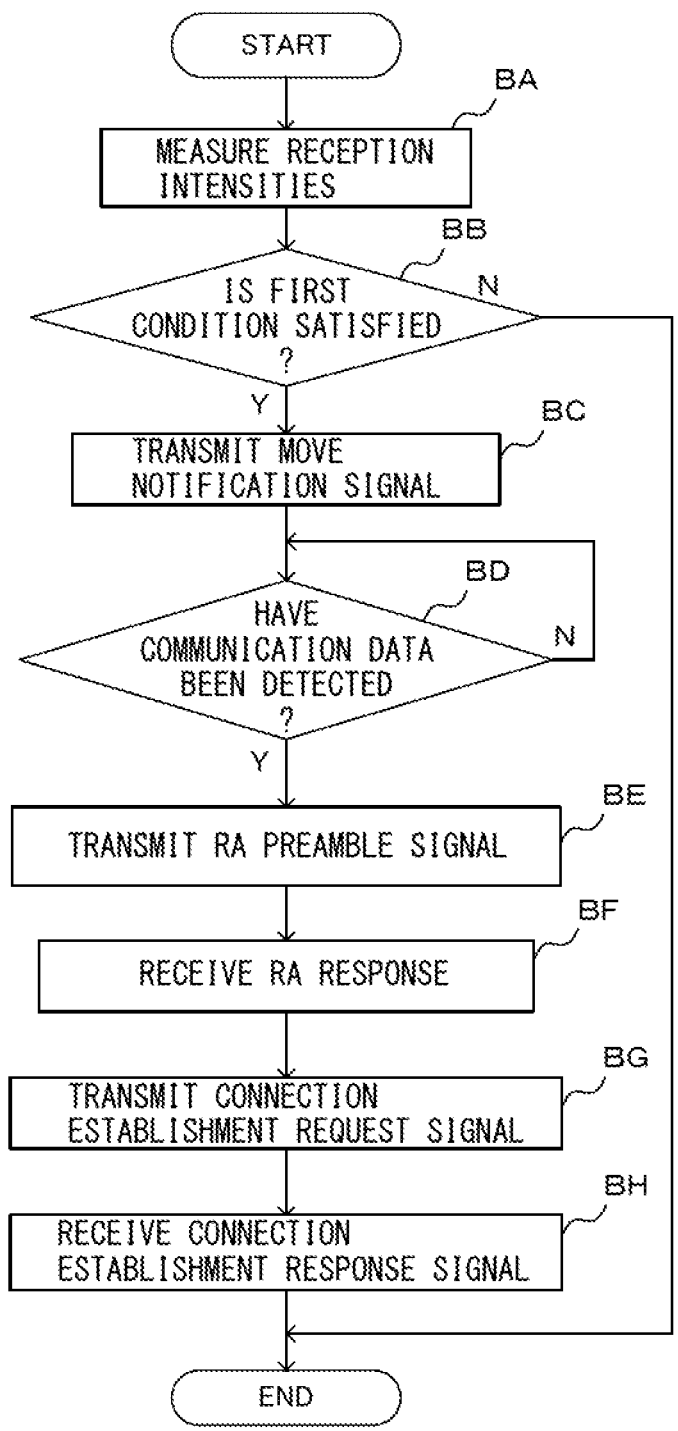
FIG. 7 is an explanatory diagram illustrating a first example of the operation of the mobile station.

The operations of the mobile station 4 and each of the base stations 3 in the HO process will be described. FIG. 7 is an explanatory diagram illustrating a first example of the operation of the mobile station 4. In Operation BA, the measuring unit 33 measures the reception intensity of a radio wave coming from each of the base stations 3. In Operation BB, the HO processing unit 34 determines whether or not the reception intensities satisfy the first condition. When the reception intensities satisfy the first condition (Operation BB: Y), the operation advances to Operation BC. When the reception intensities do not satisfy the first condition (Operation BB: N), the operation is terminated.

In Operation BC, the HO processing unit 34 transmits a move notification signal to the serving base station 3a. In Operation BD, the data processing unit 31 detects presence or absence of an occurrence of communication data in the uplink. When communication data in the uplink have been detected (Operation BD: Y), the operation advances to Operation BE. When no communication data have been detected in the uplink (Operation BD: N), the operation returns to Operation BD.

In Operation BE, the RRC connection processing unit 35 transmits an RA preamble. In Operation BF, the RRC connection processing unit 35 receives an RA response signal from the target base station 3*c*. In Operation BG, the RRC connection processing unit 35 transmits a connection establishment request signal to the target base station 3*c*. In Operation BH, the RRC connection processing unit 35 receives a connection establishment response signal from the target base station 3*c*. Thereafter, the operation is terminated.

<2.6. Operation of Serving Base Station>

Figure 8:
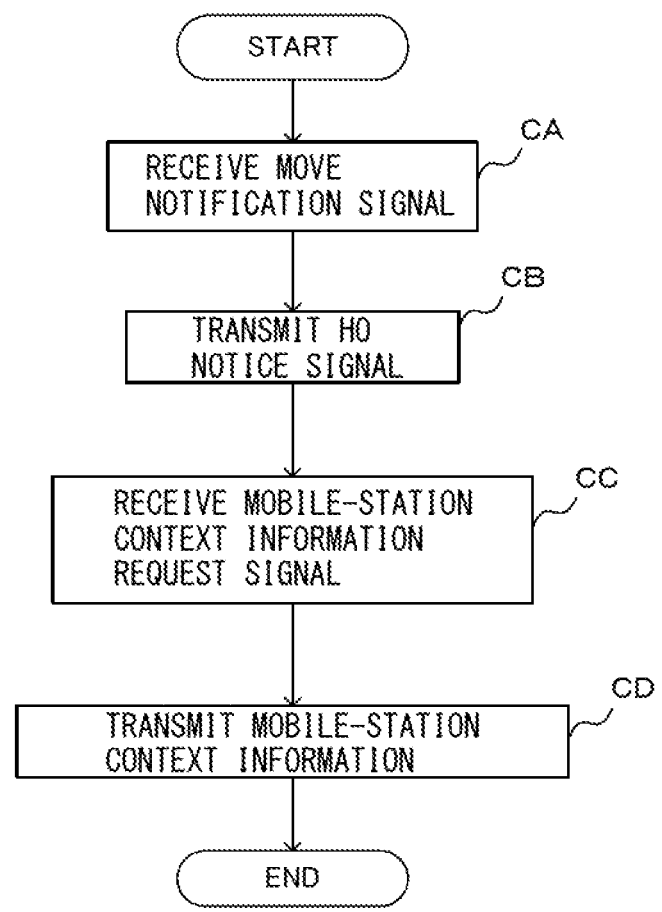
FIG. 8 is an explanatory diagram illustrating a first example of the operation of a serving base station.

FIG. 8 is an explanatory diagram illustrating a first example of the operation of the serving base station 3*a*. In Operation CA, the base station 3*a* receives a move notification signal from the mobile station 4. In Operation CB, the notice notifying unit 50 transmits an HO notice signal to the other base stations 3 located nearby.

In Operation CC, the context transmitting unit 51 receives a request for mobile-station context information on the mobile station 4 from the target base station 3*c*. In Operation CD, the context transmitting unit 51 transmits the mobile-station context information to the target base station 3*c*. Thereafter, the operation is terminated.

<2.7. Operation of Target Base Station>

Figure 9:
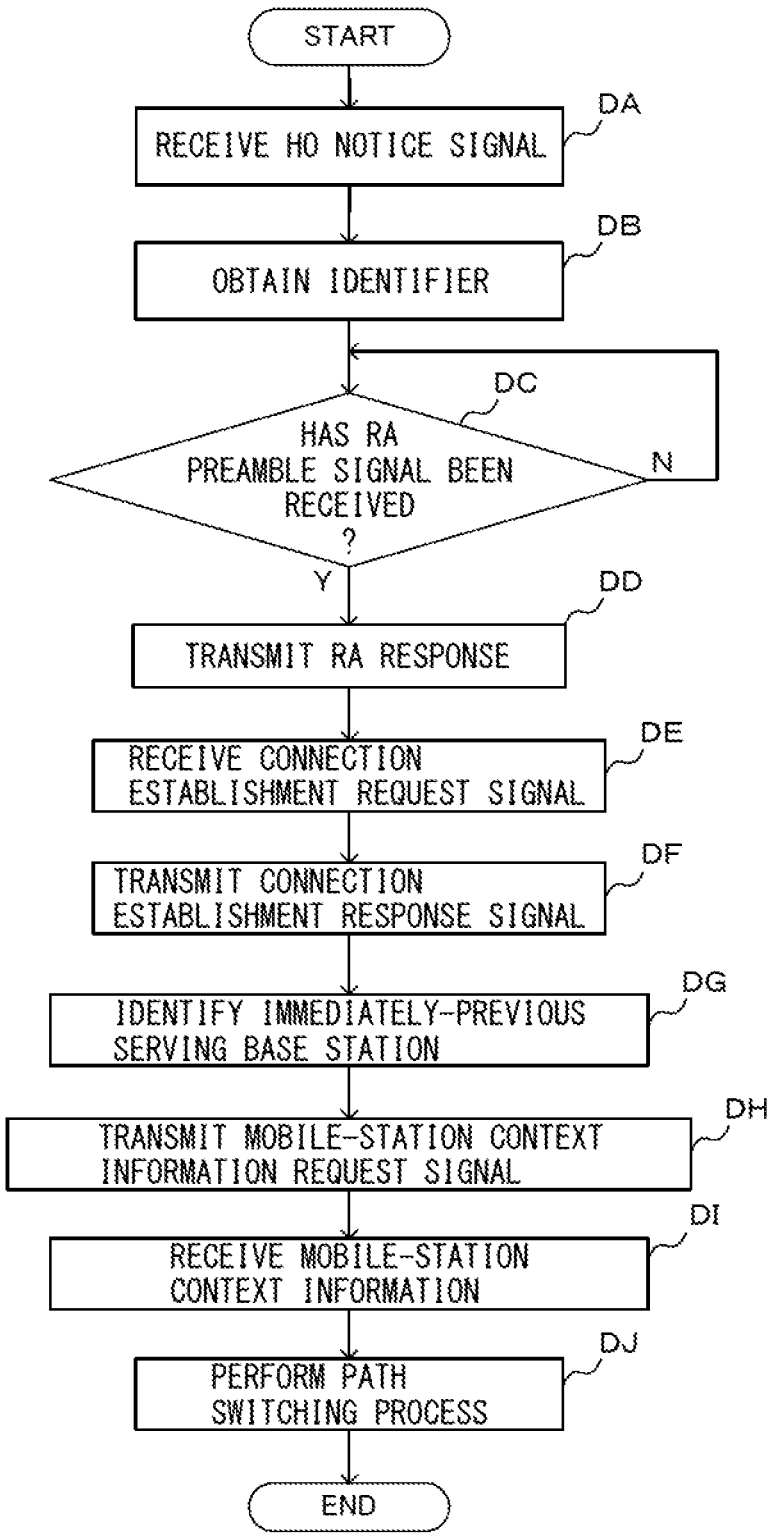
FIG. 9 is an explanatory diagram illustrating a first example of the operation of a target base station.

FIG. 9 is an explanatory diagram illustrating a first example of the operation of the target base station 3*c*. In Operation DA, the HO processing unit 43 receives an HO notice signal from the serving base station 3*a*. In Operation DB, the identifier obtaining unit 52 obtains the identifier of the base station 3*a* and the identifier of the mobile station 4 from the HO notice signal.

In Operation DC, the RRC connection processing unit 45 determines whether or not an RA preamble signal from the mobile station 4 has been received. When an RA preamble signal has been received (Operation DC: Y), the operation advances to Operation DD. When no RA preamble signal has been received (Operation DC: N), the operation returns to Operation DC. In Operation DD, the RRC connection processing unit 45 returns an RA response signal to the mobile station 4.

In Operation DE, the RRC connection processing unit 45 receives a connection establishment request signal from the mobile station 4. In Operation DF, the RRC connection processing unit 45 transmits a connection establishment response signal to the mobile station 4. In Operation DG, the identifier comparing unit 53 compares the identifier of the mobile station 4 obtained from the connection establishment request signal and the identifier of the mobile station 4 obtained from the HO notice signal, and thereby identifies the serving base station 3*a* of the mobile station 4.

In Operation DH, the context requesting unit 54 requests the serving base station 3*a* to transmit mobile-station context information on the mobile station 4. In Operation DI, the context requesting unit 54 receives the mobile-station context information, and stores the mobile-station context information in the mobile-station context information storage unit 44. In Operation DJ, the HO processing unit 43 performs, with the AGW 5, a path switching process for switching the base station through which the path for transmitting communication data to the mobile station 4 passes, to the target base station 3*c*. Thereafter, the operation is terminated.

<2.8. Effects of Embodiment>

According to this embodiment, for example, when the mobile station 4 does not perform data communications in any of the cells in the moving path, the HO process to the cell having no data communication with the mobile station 4 can be omitted. Hence, the number of times required to perform the HO process can be reduced. This can consequently reduce amount of radio resources to be used, amount of the hardware resources of the mobile station and the base stations to be used, and the power consumption. For example, when the mobile station 4 performs discontinuous operation under the control of the discontinuous-operation control unit 36, no data communications occur in any of the cells in the moving path, in some cases. According to this embodiment, the number of times required to perform the HO process during such discontinuous operation of the mobile station 4 is reduced, which can consequently reduce the power consumed with the mobile station 4.

In this embodiment, the length of the period before the HO process starts may be extended since the HO process is not performed until the mobile station 4 starts data communications again. For this reason, the number of candidates for the target base station is larger than those in conventional cases. If the mobile-station context information is transmitted to all the candidates, the traffic between the base stations 3 in the HO procedure increases. For this reason, the serving base station 3*a* transmits a notice signal including the identifier information of the mobile station 4 and the serving base 3*a*, instead of the mobile-station context information. Then, a base station 3 which has started the RA procedure with the mobile station 4 which has been specified in the notice signal is determined as the destination of the mobile-station context information, thereby reducing an increase in traffic between the base stations 3.

<2.9. Modified Example>

In the above-described embodiment, when the data processing unit 31 detects an occurrence of communication data in the uplink, the RRC connection processing unit 35 starts the process for establishing RRC connection with the target base station 3*c*. In another embodiment, the call control unit 32 may detect an occurrence of communication data in the downlink upon receipt of a paging signal from the target base station 3*c*. The RRC connection processing unit 35 may start the process for establishing RRC connection with the target base station 3*c* when an occurrence of communication data in the downlink has been detected.

<3. Second Embodiment>

<3.1. Functional Configuration>

Another embodiment will be described. The mobile station 4 may be in one of several communication states. It is possible that the mobile station 4 does not perform data communications in any one or more of the cells in the path of a move in one communication state, while the mobile station 4 frequently performs data communications in another communication state. In the case corresponding to the latter communication state, when the HO process is started upon an occurrence of communication data after a move between cells, data transmission may be delayed for a time period for performing the HO process.

Consequently, in this embodiment, the mobile station 4 determines which state the mobile station 4 is in. Then, the mobile station 4 determines the communication state according to the result of the determination. When it is highly likely in the state where the mobile station does not perform data communications in any one or more of the cells in the path of a move, the HO process is started upon an occurrence of communication data after the move between cells. When the mobile station 4 is in another state, the HO process is started regardless of whether or not communication data are present.

Figure 10:
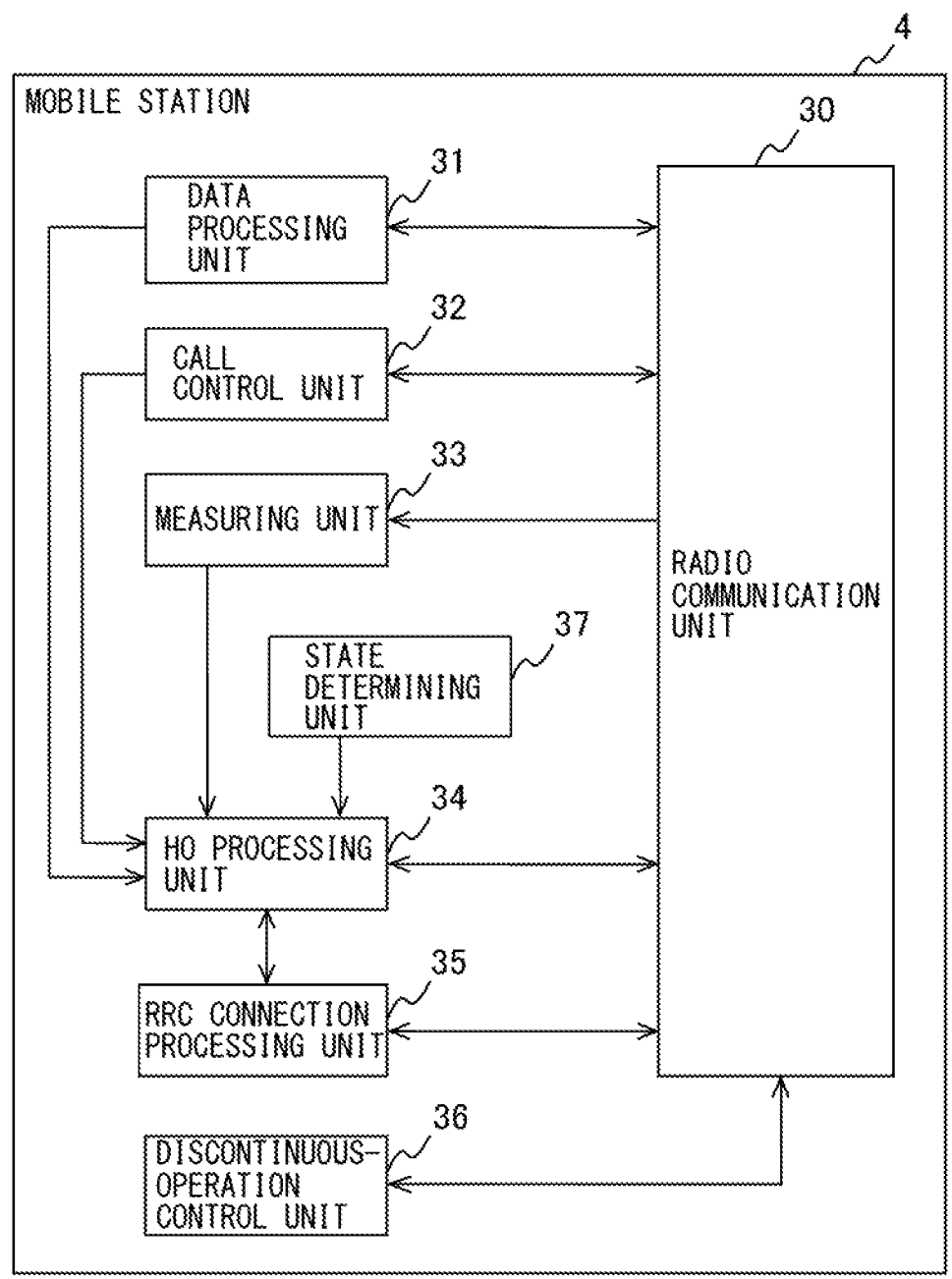
FIG. 10 is a diagram illustrating a second example of the functional configuration of the mobile station.

FIG. 10 is a diagram illustrating a second example of the functional configuration of the mobile station 4. The same elements as illustrated in FIG. 4 are denoted by the same reference numerals used in FIG. 4, and descriptions of the same functions are omitted. The mobile station 4 includes a state determining unit 37. The state determining unit 37 determines whether the mobile station 4 is in a first state where it is highly likely that the mobile station 4 does not perform data communications in any one or more of the cells in the path of the move, or in a second state which is any state other than the first state.

For example, the state determining unit 37 may determine whether the mobile station 4 is in the first state or the second state, depending on the system or the type of the mobile station 4. For example, the state determining unit 37 may determine which state the mobile state 4 is in depending on whether the mobile station 4 is a smartphone or a mobile phone. Smartphones perform discontinuous data communications in the background and do not perform data communications in one or more of the cells in the path of the move, in some cases. By contrast, mobile phones continuously perform transmission and reception of voice data during a call.

Alternatively, the state of the mobile station 4 may be determined depending on whether or not the mobile station 4 is performing any process in the background, for example. Moreover, the state determining unit 37 may determine which state the mobile station 4 is in depending on whether or not the mobile station 4 is performing discontinuous operation under the control of the discontinuous operation control unit 36, for example. The state determining unit 37 may determine which state the mobile station 4 is in by combining some of or all of these conditions.

In the second embodiment and the third embodiment to be described below, description will be given by using, as an example, the case in which the cell 7c is to be a target cell when the mobile station 4 is in the first state, while the cell 7b is to be a target cell when the mobile station 4 is in the second state.

When the mobile station 4 is in the first state, the HO processing unit 34 determines whether or not the reception intensities of radio waves from the respective base stations 3 satisfy the first condition. When the reception intensities satisfy the first condition, the HO processing unit 34 transmits a move notification signal to the serving base station 3a. When the mobile station 4 is in the second state, the HO processing unit 34 determines whether or not the reception intensities of radio waves from the respective base stations 3 satisfy the second condition for determining whether or not to perform an HO. When the reception intensities satisfy the second condition, the HO processing unit 34 transmits an MR to the serving base station 3a. The second condition may be the same as or different from the first condition.

When an MR is transmitted to the serving base station 3a, the HO processing unit 34 receives an HO instruction signal from the serving base station 3a. Upon receipt of an HO instruction signal, the HO processing unit 34 starts the HO process with the target base station 3b.

Figure 11:
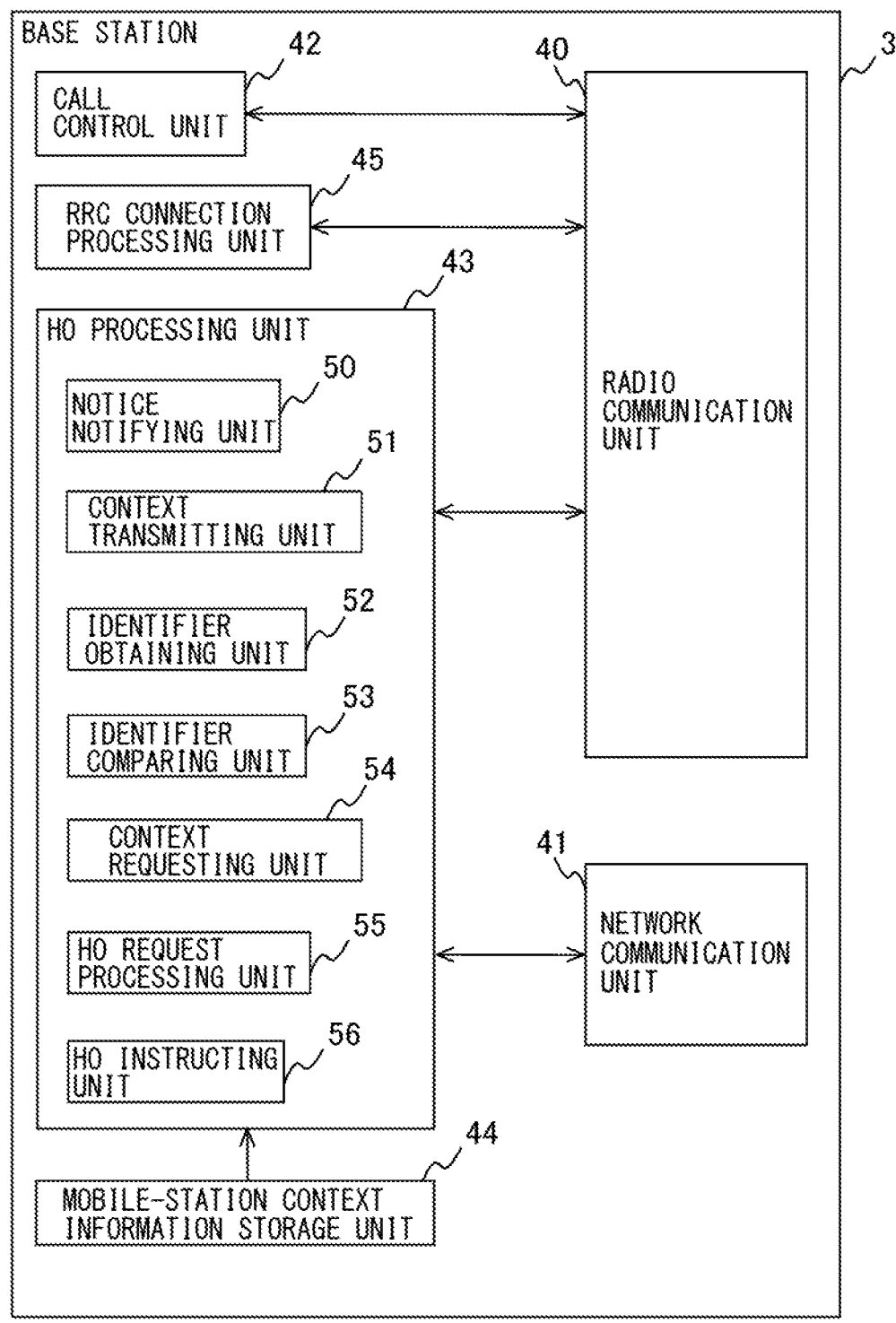
FIG. 11 is a diagram illustrating a second example of the functional configuration of the base station.

FIG. 11 is a diagram illustrating a second example of the functional configuration of each of the base stations 3. The same elements as those illustrated in FIG. 5 are denoted by the same reference numerals as those used in FIG. 5, and descriptions of the same functions are omitted. The HO processing unit 43 of the base station 3 includes an HO request processing unit 55 and an HO instructing unit 56. When the HO processing unit 43 receives an MR from the mobile station 4, the HO request processing unit 55 transmits an HO request signal to the target base station 3b.

The HO request processing unit 55 of the target base station 3b determines whether or not to perform the HO process requested by the serving base station 3a, and returns an HO request response signal when performing the HO process. When the HO request processing unit 55 of the serving base station 3a has received the HO request response signal, the context transmitting unit 51 transmits the mobile-station context information on the mobile station 4 to the target base station 3b. Moreover, the HO instructing unit 56 transmits an HO instruction signal to the mobile station 4.

<3.2. Signal Sequence>

Figure 12:
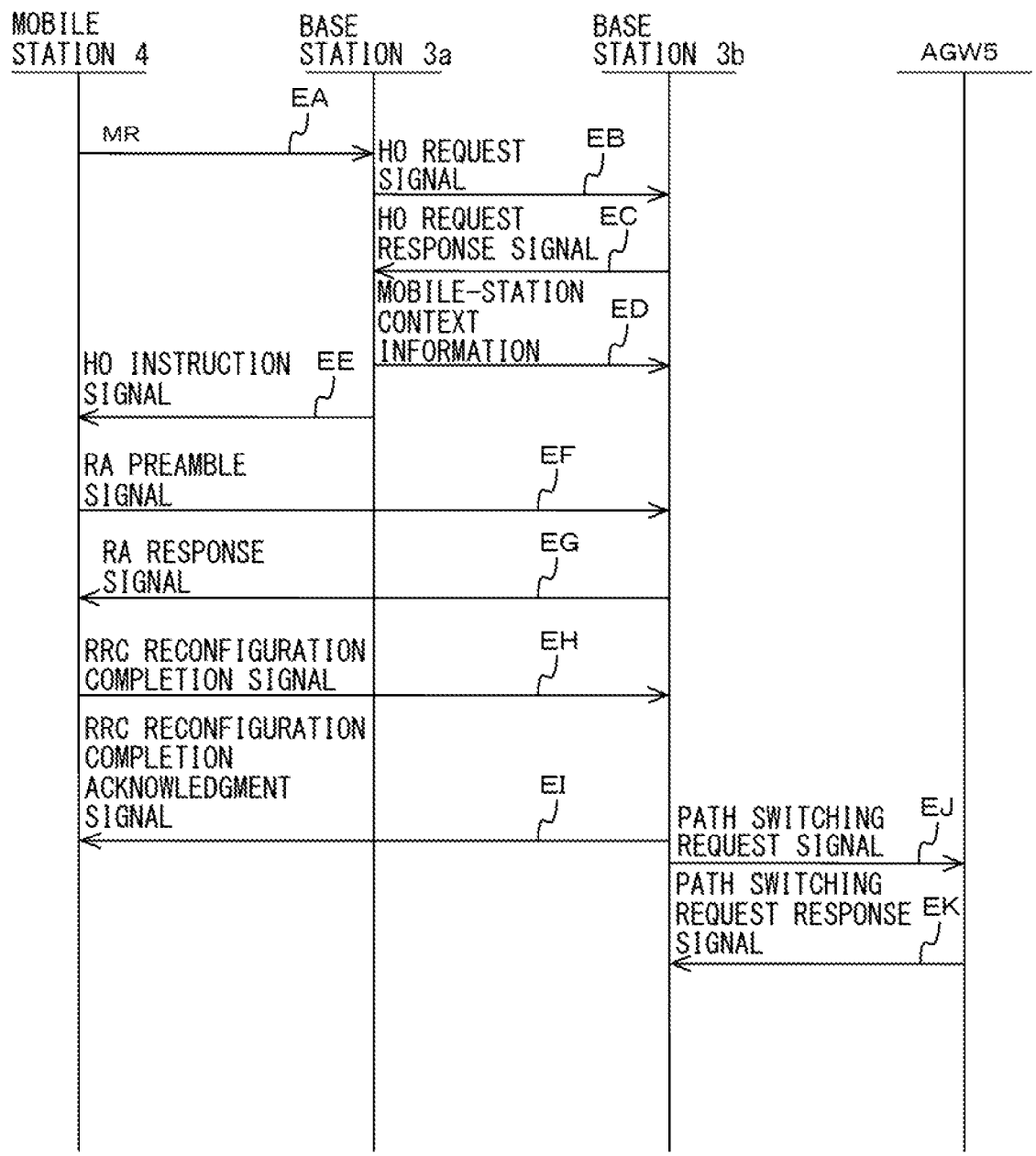
FIG. 12 is an explanatory diagram illustrating a second example of the signal sequence in the handover process.

With reference to FIG. 12, an example of the signal sequence in the HO process of the second embodiment will be described. When the mobile station 4 is in the second state and the reception intensities of radio waves from the respective base stations 3 satisfy the second condition, the HO processing unit 34 transmits an MR to the serving base station 3a in Operation EA.

On the other hand, when the mobile station 4 is in the first state and the reception intensities of radio waves from the respective base stations 3 satisfy the first condition, the HO processing unit 34 transmits a move notification signal to the serving base station 3a. The signal sequence in this case is the same as in FIG. 6.

In Operation EB, the HO request processing unit 55 of the serving base station 3a transmits an HO request signal to the target base station 3b. In Operation EC, the HO request processing signal 55 of the target base station 3b transmits an HO request response signal to the serving base station 3a. In Operation ED, the context transmitting unit 51 of the serving base station 3a transmits the mobile-station context information on the mobile station 4 to the target base station 3b.

In Operation EE, the HO instructing unit 56 of the serving base station 3a transmits an HO instruction signal to the mobile station 4. In Operation EF, the RRC connection processing unit 35 of the mobile station 4 transmits an RA preamble. In Operation EG, the RRC connection processing unit 45 of the target base station 3b returns, to the mobile station 4, an RA response signal corresponding to the RA preamble.

In Operation EH, the RRC connection processing unit 35 of the mobile station 4 transmits, to the target base station 3b, an RRC reconfiguration completion signal for notifying that the reconfiguration of the RRC has been completed. In Operation EI, the RRC connection processing unit 45 of the target base station 3b transmits an RRC reconfiguration completion acknowledgment signal, which is a response signal corresponding to the RRC reconfiguration completion signal. Through the above operations, RRC connection between the mobile station 4 and the target base station 3b is established.

In Operation EJ, the HO processing unit 43 of the target base station 3b transmits a path switching request signal to the AGW 5. In Operation EK, the AGW 5 transmits a path switching request response signal to the target base station 3b.

<3.3. Operation of Mobile Station>

Figure 13:
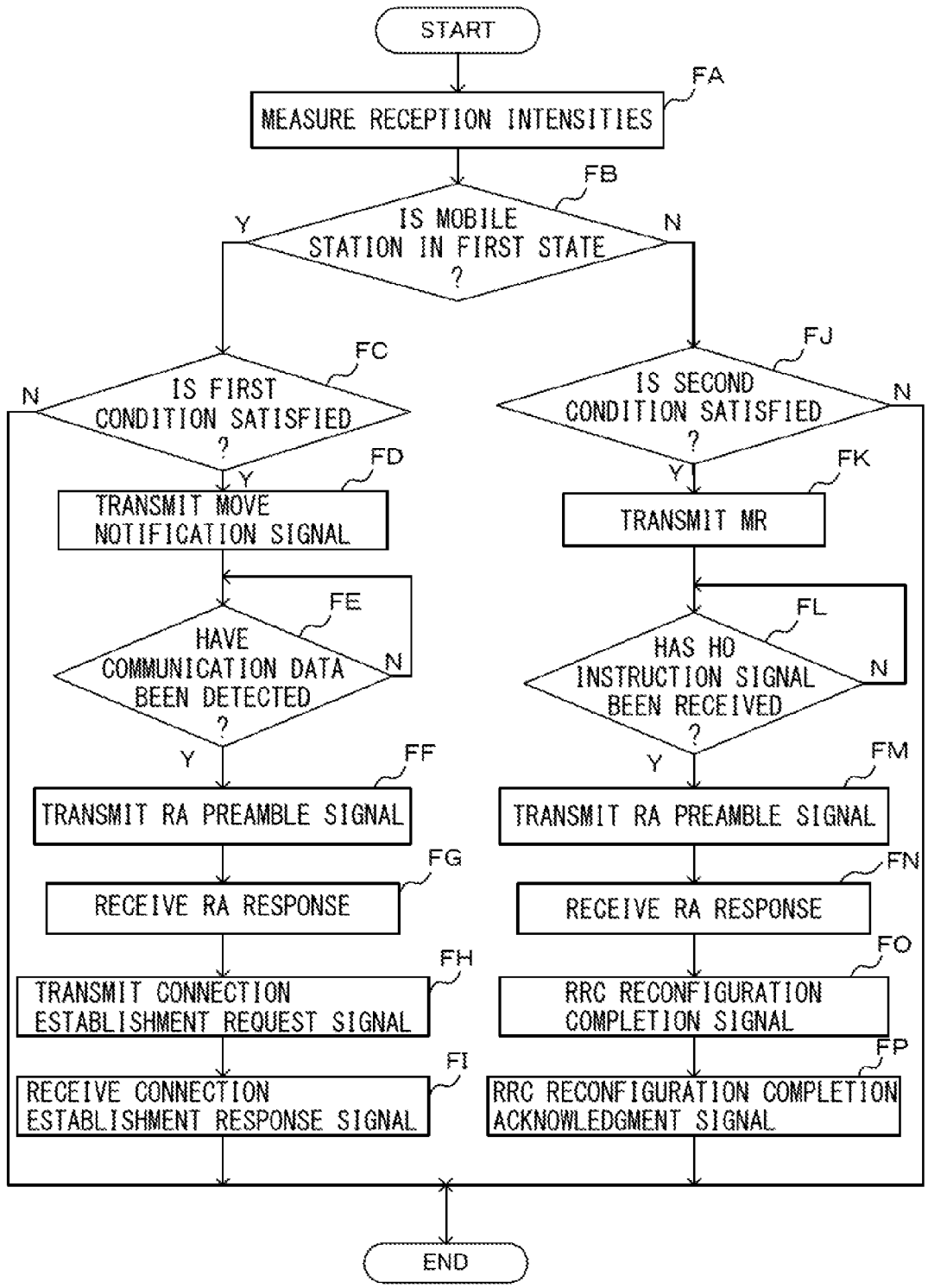
FIG. 13 is an explanatory diagram illustrating a second example of the operation of the mobile station.

Next, the operation of the mobile station 4 and each of the base stations 3 of the second embodiment will be described. FIG. 13 is an explanatory diagram illustrating a second example of the operation of the mobile station 4. In Operation FA, the measuring unit 33 measures the reception intensities of radio waves coming from the respective base stations 3. In Operation FB, the state determining unit 37 determines whether or not the mobile station 4 is in the first state.

When the mobile station 4 is in the first state (Operation FB: Y), the operation advances to Operation FC. When the mobile station 4 is in the second state (Operation FB: N), the operation advances to Operation FJ. The operations in Operations FC to FI are the same as those in Operations BB to BH in FIG. 7.

In Operation FJ, the HO processing unit 34 determines whether or not the reception intensities of radio waves from the respective base stations 3 satisfy the second condition. When the reception intensities satisfy the second condition (Operation FJ: Y), the operation advances to Operation FK. When the reception intensities do not satisfy the second condition (Operation FJ: N), the operation is terminated. In Operation FK, the HO processing unit 34 transmits an MR to the serving base station 3a.

In Operation FL, the HO processing unit 34 determines whether or not an HO instruction signal from the serving base station 3a has been received. When the HO instruction signal has been received (Operation FL: Y), the operation advances to Operation FM. When no HO instruction signal has been received (Operation FL: N), the operation returns to Operation FL.

In Operation FM, the RRC connection processing unit 35 transmits an RA preamble. In Operation FN, the RRC connection processing unit 35 receives an RA response signal from the target base station 3b. In Operation FO, the RRC connection processing unit 35 transmits an RRC reconfiguration completion signal to the target base station 3cb. In Operation FP, the RRC connection processing unit 35 receives an RRC reconfiguration completion acknowledgment signal from the target base station 3b. Thereafter, the operation is terminated.

<3.4. Operation of Serving Base Station>

Figure 14:
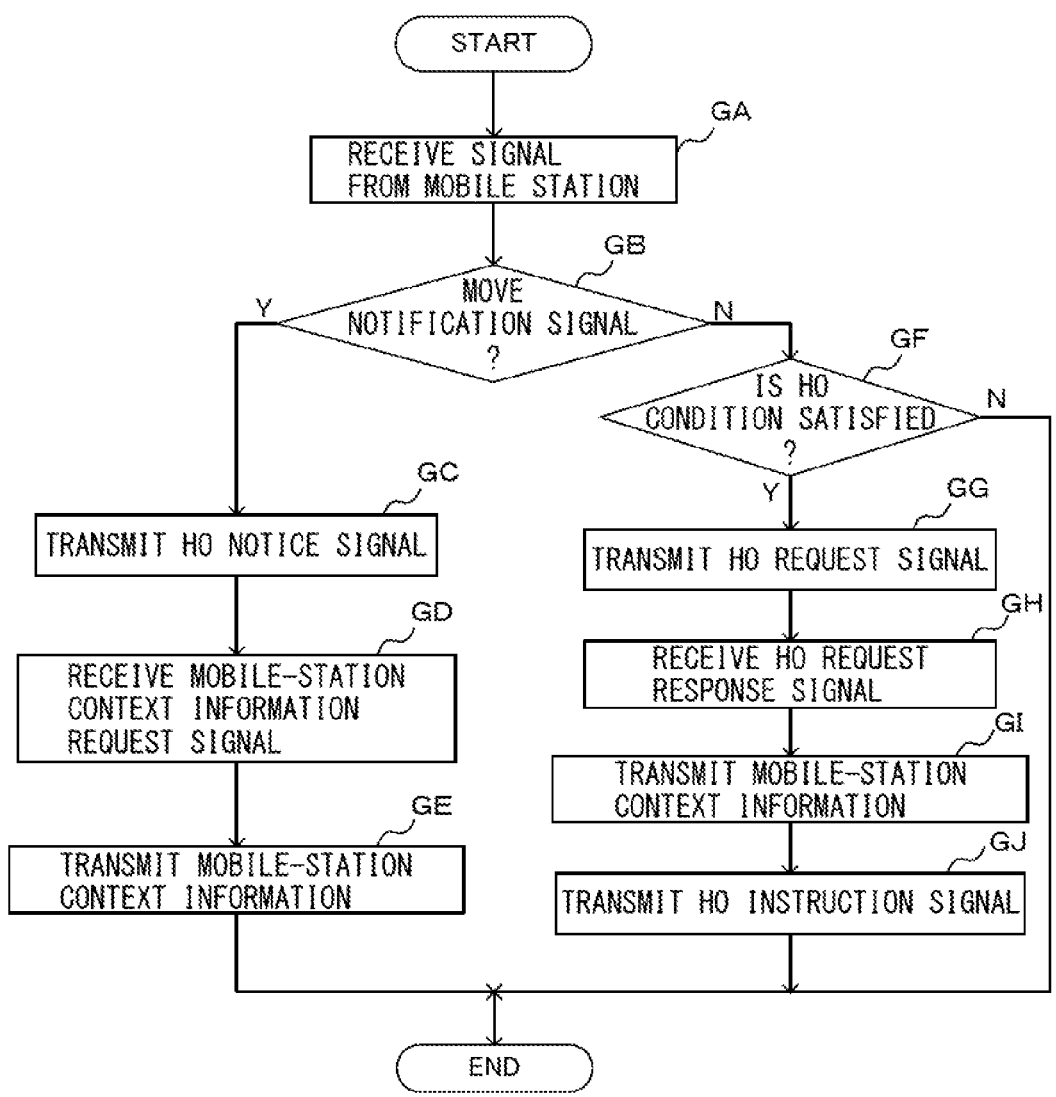
FIG. 14 is an explanatory diagram illustrating a second example of the operation of the serving base station.

FIG. 14 is an explanatory diagram illustrating a second example of the operation of the serving base station 3a. In Operation GA, the HO processing unit 43 receives a move notification signal or an MR from the mobile station 4. When a move notification signal is received (Operation GB: Y), the operation advances to Operation GC. When an MR is received (Operation GB: N), the operation advances to Operation GF. The operations in Operations GC to GE are the same as those in Operations CB to CD in FIG. 8.

In Operation GF, the HO processing unit 43 determines whether or not the MR satisfies a predetermined HO condition. When the MR satisfies the HO condition (Operation GF: Y), the operation advances to Operation GG. When the MR does not satisfy the HO condition (Operation GF: N), the operation is terminated.

In Operation GG, the HO request processing unit 55 transmits an HO request signal to the target base station 3b. In Operation GH, the HO request processing unit 55 receives an HO request response signal from the target base station 3b. In Operation GI, the context transmitting unit 51 transmits mobile-station context information on the mobile station 4 to the target base station 3b. In Operation GJ, the HO instructing unit 56 transmits an HO instruction signal to the mobile station 4. Thereafter, the operation is terminated.

<3.5. Operation of Target Base Station>

Figure 15:
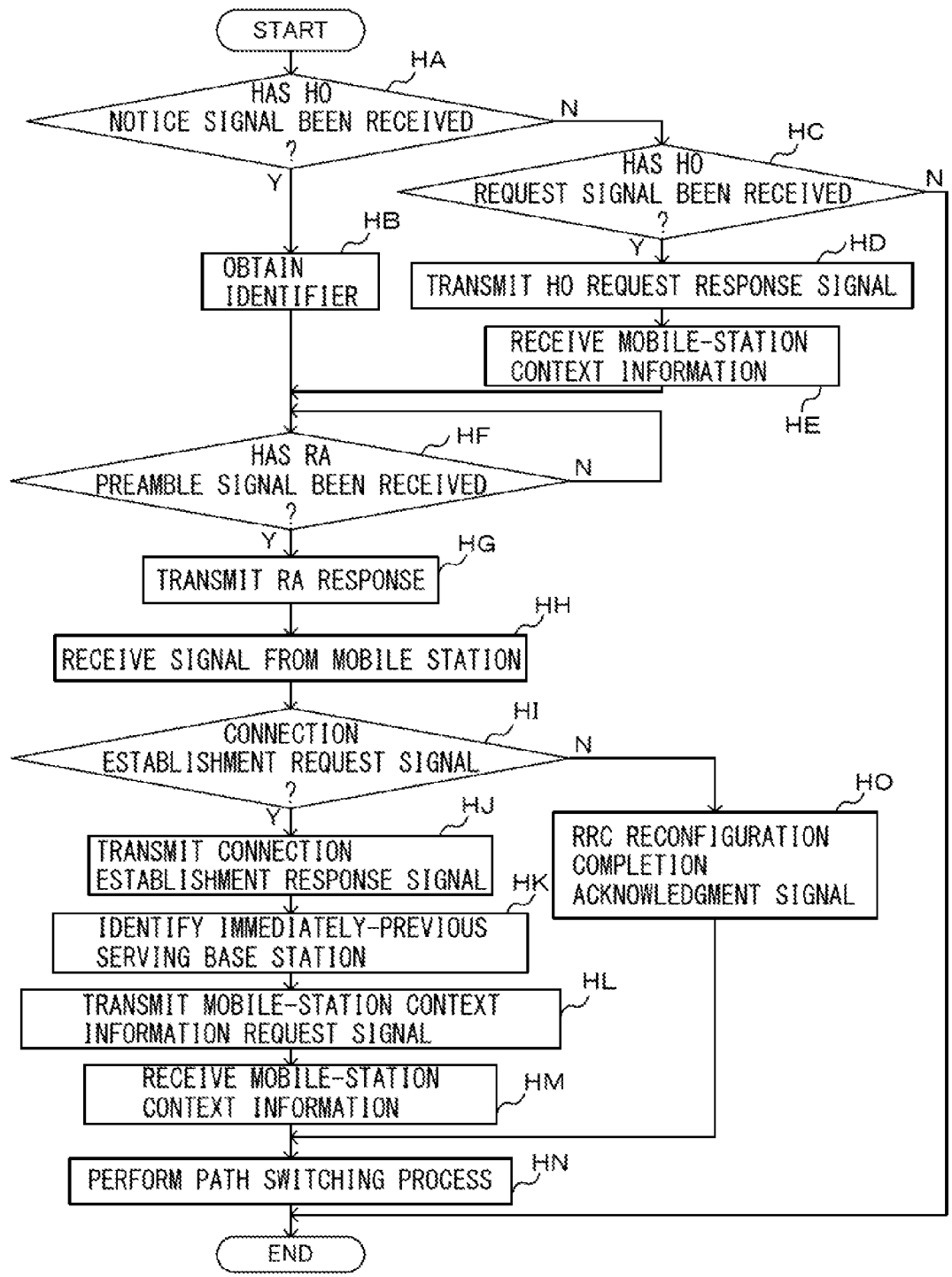
FIG. 15 is an explanatory diagram illustrating a second example of the operation of the target base station.

FIG. 15 is an explanatory diagram illustrating a second example of the operation of the target base station 3b or 3c. In Operation HA, the HO processing unit 43 determines whether or not an HO notice signal from the serving base station 3a has been received. When the HO notice signal has been received (Operation HA: Y), the operation advances to Operation HB. When no HO notice signal has been received (Operation HA: N), the operation advances to Operation HC. In Operation HB, the identifier obtaining unit 52 obtains the identifier of the base station 3a and the identifier of the mobile station 4 from the HO notice signal. Thereafter, the operation advances to Operation HF.

In Operation HC, the HO request processing unit 55 determines whether or not an HO request signal from the serving base station 3a has been received. When the HO request signal has been received (Operation HC: Y), the operation advances to Operation HD. When no HO request signal has been received (Operation HC: N), the operation is terminated.

In Operation HD, the HO request processing unit 55 transmits an HO request response signal to the serving base station 3a. In Operation HE, the HO processing unit 43 receives mobile-station context information from the serving base station 3a. Thereafter, the operation advances to Operation HF.

In Operation HF, the RRC connection processing unit 45 determines whether or not an RA preamble signal from the mobile station 4 has been received. When the RA preamble signal has been received (Operation HF: Y), the operation advances to Operation HG. When no RA preamble signal has been received (Operation HF: N), the operation returns to Operation HF. In Operation HG, the RRC connection processing unit 45 returns an RA response signal to the mobile station 4.

In Operation HH, the RRC connection processing unit 45 receives a connection establishment request signal or an RRC reconfiguration completion signal from the mobile station 4. When the connection establishment request signal has been received (Operation HI: Y), the operation advances to Operation HJ. When the RRC reconfiguration completion signal has been received (Operation HI: N), the operation advances to Operation HO.

The operations in Operations HI to HN are the same as in Operations DF to DJ in FIG. 9. After Operation HN, the operation is terminated. In Operation HO, the RRC connection processing unit 45 transmits an RRC reconfiguration completion acknowledgment signal to the mobile station 4. Thereafter, the operation advances to Operation HN.

<3.6. Effects>

According to this embodiment, it is possible to switch between starting the HO process upon an occurrence of communication data after a move between cells and starting the HO process regardless of whether or not communication data are present. Accordingly, for example, when it is highly likely that the mobile station 4 does not perform data communications in any one or more of the cells in the path of a move, the HO process is started upon an occurrence of communication data, which can reduce the number of times to perform the HO process. By contrast, when the mobile station 4 frequently performs data communications, possibility of a delay in data transmission due to the HO process being performed upon an occurrence of communication data can be reduced.

<4. Third Embodiment>
<4.1. Functional Configuration>

Another embodiment will be described. In this embodiment, the serving base station 3a determines whether the mobile station 4 is in the first state or in the second state. When the mobile station 4 is in the first state, the serving base station 3a causes the mobile station 4 to start the HO process upon an occurrence of communication data after a move between cells. By contrast, when the mobile station 4 is in the second state, the serving base station 3a starts the HO process regardless of whether or not communication data are present.

Figure 16:
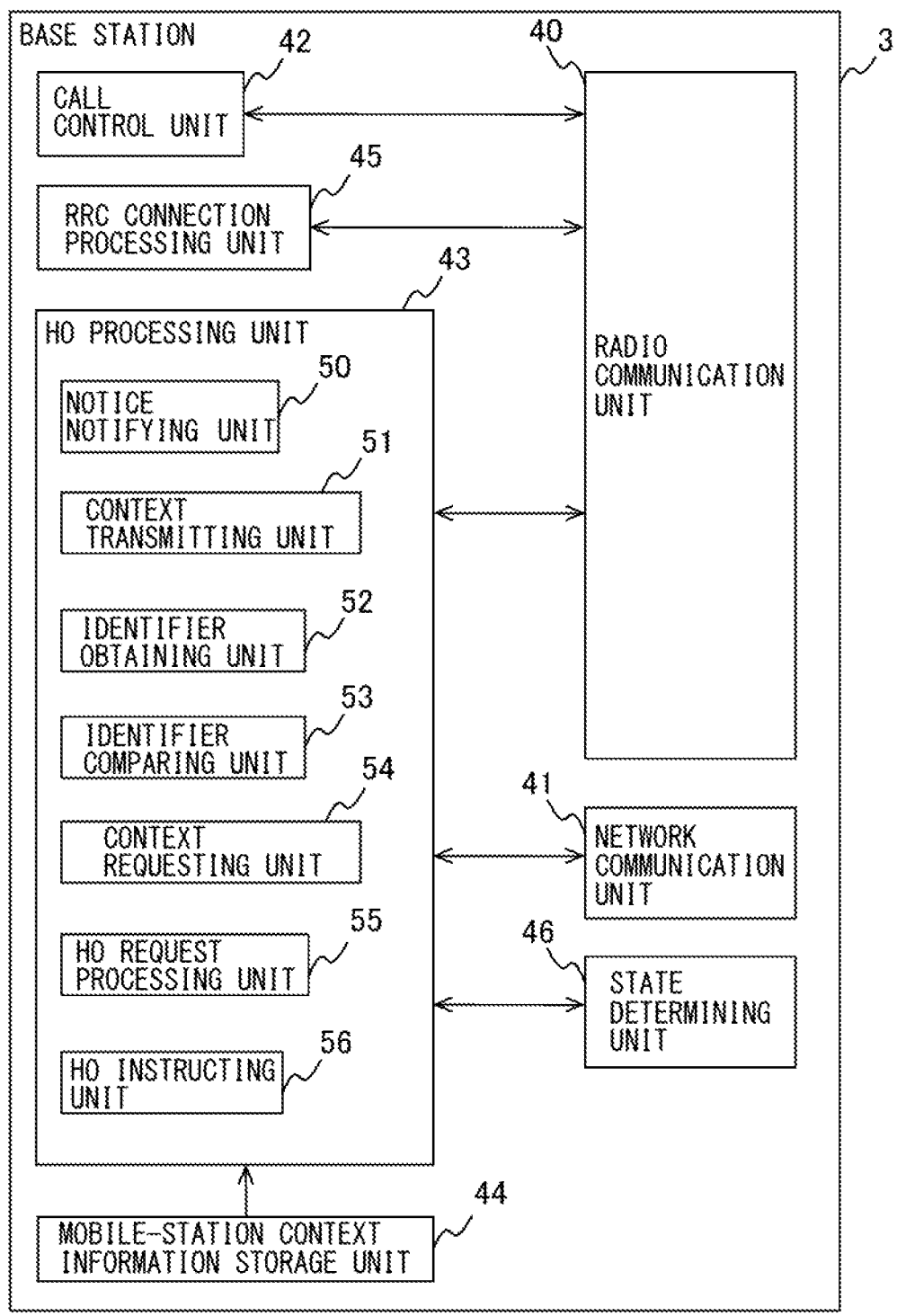
FIG. 16 is a diagram illustrating a third example of the functional configuration of the base station.

FIG. 16 is a diagram illustrating a third example of the functional configuration of each of the base stations 3. The same elements as those in FIG. 11 are denoted by the same reference numerals as those used in FIG. 11, and descriptions of the same functions are omitted.

The base station 3 includes a state determining unit 46. The state determining unit 46 determines whether the mobile station 4 is in the first state or in the second state. When an MR received from the mobile station 4 satisfies the HO condition and the mobile station 4 is in the first state, the HO processing unit 43 transmits a move notification signal to the mobile station 4. By transmitting the move notification signal, the HO processing unit 43 causes the mobile station 4 to delay starting the HO process until first communication data occur after the receipt of the move notification signal. The notice notifying unit 50 transmits an HO notice signal to the other base stations 3 located nearby.

When the MR received from the mobile station 4 satisfies the HO condition and the mobile station 4 is in the second state, the HO request processing unit 55 transmits an HO request signal to the target base station 3b. When an HO request response signal is transmitted from the target base station 3b, the context transmitting unit 51 transmits the mobile-station context information on the mobile station 4 to the target base station 3b. Moreover, the HO instructing unit 56 transmits an HO instruction signal to the mobile station 4.

<4.2. Signal Sequence>

Figure 17:
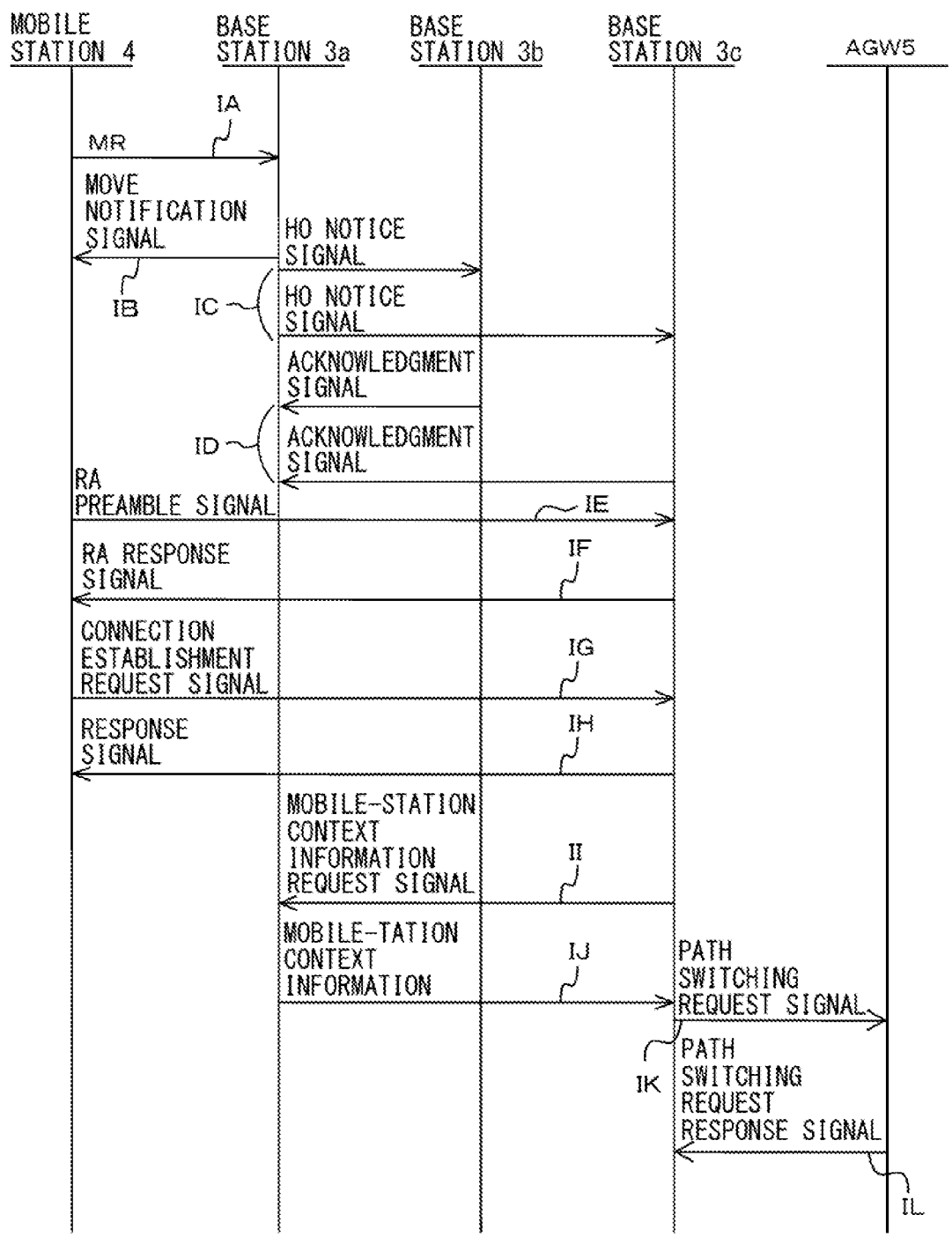
FIG. 17 is an explanatory diagram illustrating a third example of the signal sequence in the handover process.

With reference to FIG. 17, an example of the signal sequence in the HO process of the third embodiment will be described. In Operation IA, the mobile station 4 transmits an MR to the serving base station 3a. When the MR satisfies the HO condition and the mobile station 4 is in the first state, the HO processing unit 43 of the serving base station 3a transmits a move notification signal to the mobile station 4 in Operation IB.

On the other hand, when the MR satisfies the HO condition and the mobile station 4 is in the second state, the HO request processing unit 55 transmits an HO request signal to the target base station 3b. The signal sequence in this case is the same as that in FIG. 12.

In Operation IC, the HO processing unit 43 of the serving base station 3a transmits, to the base stations 3b and 3c located nearby, an HO notice signal for notifying of an HO of the mobile station 4. In Operation ID, the HO processing unit 43 of each of the base stations 3b and 3c transmits, to the serving base station 3a, an acknowledgment signal for notifying of success in receiving the HO notice signal. The subsequent operations in Operations IE to IL are the same as those in Operations AD to AK in FIG. 6.

<4.3. Operation of Mobile Station>

The operation of the mobile station 4 and each of the base stations 3 of the third embodiment will be described. FIG. 18 is an explanatory diagram illustrating a third example of the operation of the mobile station 4. In Operation JA, the measuring unit 33 measures the reception intensities of radio waves coming from the respective base stations 3. In Operation JB, the HO processing unit 34 determines whether or not the reception intensities satisfy the second condition. When the reception intensities satisfy the second condition (Operation JB: Y), the operation advances to Operation JC. When the reception intensities do not satisfy the second condition (Operation JB: N), the operation is terminated. In Operation JC, the HO processing unit 34 transmits an MR to the serving base station 3a.

In operation JD, the HO processing unit 34 determines whether or not a move notification signal transmitted from the serving base station 3a has been received. When the move notification signal has been received (Operation JD: Y), the operation advances to Operation JE. When no move notification signal has been received (Operation JD: N), the operation advances to Operation JJ. The operations in Operations JE to JI are the same as in Operations BE to BH in FIG. 7. Thereafter, the operation is terminated.

In Operation JJ, the HO processing unit 34 determines whether or not an HO instruction signal transmitted from the serving base station 3a has been received. When the HO instruction signal has been received (Operation JJ: Y), the operation advances to Operation JK. When no HO instruction signal has been received (Operation JJ: N), the operation is terminated. The operations in Operations JK to JN are the same as those in Operations JK to JN in FIG. 13. Thereafter, the operation is terminated.

<4.4. Operation of Serving Base Station>

FIG. 19 is an explanatory diagram illustrating a third example of the operation of the serving base station 3a. In Operation KA, the HO processing unit 43 receives an MR from the mobile station 4. In Operation KB, the HO processing unit 43 determines whether or not the MR satisfies the predetermined HO condition. When the MR satisfies the HO condition (Operation KB: Y), the operation advances to Operation KC. When the MR does not satisfy the HO condition (Operation KB: N), the operation is terminated.

In Operation KC, the state determining unit 46 determines whether the mobile station 4 is in the first state or in the second state. When the mobile station 4 is in the first state (Operation KC: Y), the operation advances to Operation KD. When the mobile station 4 is in the second state (Operation KC: N), the operation advances to Operation KG. The operations in Operations KD to KF are the same as in Operations CB to CD in FIG. 8. Thereafter, the operation is terminated. The operations in Operations KG to KJ are the same as in Operations GG to GJ in FIG. 14. Thereafter, the operation is terminated.

<4.5. Effects>

Also according to this embodiment, it is possible to switch between starting the HO process upon an occurrence of communication data after a move between cells and starting the HO process regardless of whether or not communication data are present. Accordingly, for example, when it is highly likely that the mobile station 4 does not perform data communications in any one or more of the cells in the path of a move, the number of times to perform the HO process can be reduced. At the same time, possibility of a delay in data transmission by the mobile station 4 frequently performing data communications can be reduced.

All examples and conditional language recited herein are intended for pedagogical purposes to aid the reader in understanding the present invention and the concepts contributed by the inventors to furthering the art, and are to be construed as being without limitation to such specifically recited examples and conditions mentioned above, nor does the organization of such examples in the description related to showing of the superiority or inferiority of the present invention. Although the embodiments of the present invention have been described in detail, it should be understood that various changes, substitutions, and alternations could be made hereto without departing from the spirit and scope of the present invention.

What is claimed is:

1. A mobile station comprising:
   a memory; and
   a processor circuit, the processor circuit configured to:
      transmit a notification signal to a first base station forming a serving cell, when a certain condition used to determine whether or not to perform a handover is satisfied; and start a handover process according to presence of communication data between a second base station and the mobile station after transmission of the notification signal, and not start the handover process according to absence of the communication data between the second base station and the mobile station after transmission of the notification signal.

2. The mobile station according to claim 1, the processor circuit further configured to:
detect an occurrence of the communication data after the transmission of the notification signal, wherein
the processor circuit starts the handover process according to the detection of the occurrence of the communication data.

3. The mobile station according to claim 2, the processor circuit further configured to:
receive a second notification signal for notifying that the mobile station satisfies a handover condition, or a handover instruction, from the first base station forming the serving cell, wherein
the processor circuit starts the handover process according to the detection of the occurrence of the communication data when the second notification signal is received, while starting the handover process regardless of the detection of the occurrence of the communication data when the handover instruction is received.

4. The mobile station according to claim 2, wherein the processor circuit -detects occurrence of communication data in downlink, based on a paging signal from the second base station.

5. The mobile station according to claim 2, the processor circuit further configured to:
determine which state the mobile station is in, wherein
the processor circuit starts the handover process according to the detection of the occurrence of the communication data when the mobile station is in a first state, while starting the handover process regardless of the detection of the occurrence of the communication data when the mobile station is in a second state.

6. A communication method comprising:
determining whether or not a mobile station satisfies a certain condition used to determine whether or not to perform a handover;
transmitting a notification signal from the mobile station to a first base station forming a serving cell, when the certain condition is satisfied;
detecting communication data between the mobile station and a second base station after transmission of the notification signal;
starting a handover process between a second base station and the mobile station when the communication data is detected; and
not starting the handover process between the second base station and the mobile station when the communication data is not detected.

7. A radio communication system including a mobile station and a base station communicating with the mobile station,
the mobile station comprising a first processor circuit, the first processor circuit configured to:
transmit a notification signal to the base station when a certain condition used to determine whether or not to perform a handover is satisfied; and
start a handover process according to presence of communication data between a second base station and the mobile station after transmission of the notification signal, and not start the handover process according to absence of the communication data between the second base station and the mobile station after transmission of the notification signal, and
the base station comprising a second processor circuit, the second processor circuit configured to:
receive the notification signal.

* * * * *